United States Patent
Chen et al.

(10) Patent No.: US 11,015,063 B2
(45) Date of Patent: May 25, 2021

(54) ANTI-ICING COATINGS

(71) Applicant: MASSACHUSETTS INSTITUTE OF TECHNOLOGY, Cambridge, MA (US)

(72) Inventors: Dayong Chen, Dorchester, MA (US); Robert E. Cohen, Jamaica Plain, MA (US); Gareth H. McKinley, Acton, MA (US)

(73) Assignee: MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 157 days.

(21) Appl. No.: 16/087,627

(22) PCT Filed: Mar. 21, 2017

(86) PCT No.: PCT/US2017/023477
§ 371 (c)(1),
(2) Date: Sep. 21, 2018

(87) PCT Pub. No.: WO2017/213730
PCT Pub. Date: Dec. 14, 2017

(65) Prior Publication Data
US 2020/0131375 A1     Apr. 30, 2020

Related U.S. Application Data

(60) Provisional application No. 62/312,417, filed on Mar. 23, 2016.

(51) Int. Cl.
*C09D 5/00*     (2006.01)
*C09D 183/04*   (2006.01)

(52) U.S. Cl.
CPC ............ *C09D 5/00* (2013.01); *C09D 183/04* (2013.01)

(58) Field of Classification Search
CPC ...... C09D 5/00; C09D 163/00; C09D 175/04; C09D 183/04
USPC ........................................................ 523/169
See application file for complete search history.

(56) References Cited

FOREIGN PATENT DOCUMENTS

CA       1329743       *    5/1994

* cited by examiner

*Primary Examiner* — Edward J Cain
(74) *Attorney, Agent, or Firm* — Honigman LLP

(57) ABSTRACT

An anti-icing coating can include an amphiphilic copolymer on a surface of an article.

18 Claims, 13 Drawing Sheets

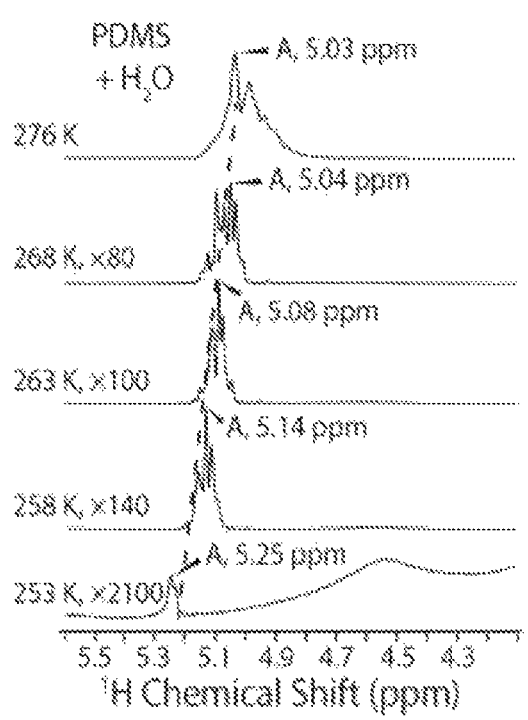
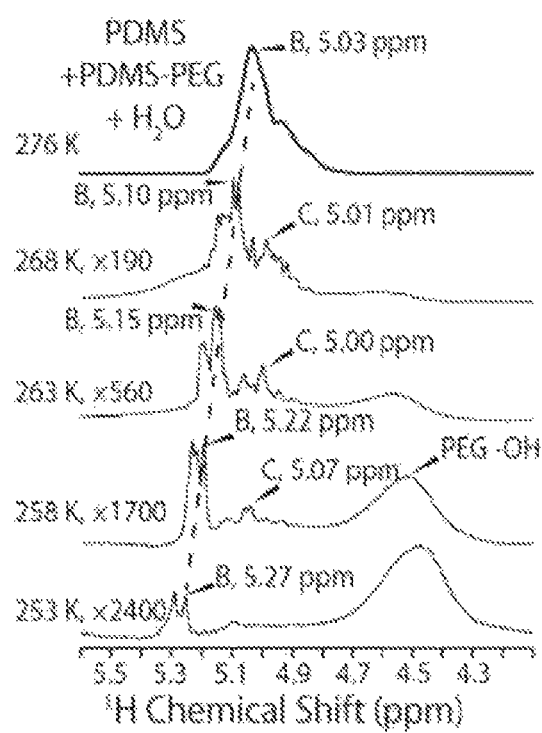
FIG. 7A  FIG. 7B

ANTI-ICING COATINGS

CLAIM OF PRIORITY

This application claims priority under 35 USC 371 to International Application No. PCT/US2017/023477, filed on Mar. 21, 2017, which claims priority to provisional U.S. Patent Application No. 62/312,417, filed Mar. 23, 2016, each of which is incorporated by reference in its entirety.

FEDERALLY SPONSORED RESEARCH OR DEVELOPMENT

This invention was made with Government support under Contract No. W911NF-13-D-0001 awarded by the Army Research Office. The Government has certain rights in the invention.

TECHNICAL FIELD

This invention relates to anti-icing coatings.

BACKGROUND

The formation and accumulation of ice on a substrate can affect the operational performance, and/or cause significant damage of many different types of structures, such as airplanes, ships, wind turbines, power lines, vehicles, buildings and solar panels. See, Kreder, M. J.; Alvarenga, J.; Kim, P.; Aizenberg, J., Design of Anti-Icing Surfaces: Smooth, Textured or Slippery? *Nat. Rev.* Mater. 2016, 1, 15003, Lv, J.; Song, Y.; Jiang, L.; Wang, J., Bio-Inspired Strategies for Anti-Icing. *ACS Nano* 2014, 8, 3152-3169, and Meuler, A. J.; Smith, J. D.; Varanasi, K. K.; Mabry, J. M.; McKinley, G. H.; Cohen, R. E., Relationships between Water Wettability and Ice Adhesion. *ACS Appl. Mater. Interfaces* 2010, 2, 3100-3110, each of which is incorporated by reference in its entirety. Ice accretion changes the shape and roughness of the wind turbine blade, leading to power loss and even to mechanical failures. Many wind turbines are designed to reduce power or shut off completely if too much ice accumulation occurs. See, Dalili, N.; Edrisy, A.; Carriveau, R., A Review of Surface Engineering Issues Critical to Wind Turbine Performance. *Renew. Sustainable Energy Rev.* 2009, 13, 428-438, which is incorporated by reference in its entirety.

SUMMARY

An anti-icing coating can contain a small amount of an amphiphilic copolymer. These coating can reduce or retard ice formation, and reduce the ice adhesion strength relative to the adhesion strength on the surface of the uncoated substrate.

In one aspect, an anti-icing article can include a coating including polymer composition including a matrix polymer and an amphiphilic copolymer on a surface of the article.

In another aspect, a method of forming an anti-icing coating a surface of an article can include depositing a polymer composition including a matrix polymer and an amphiphilic copolymer on a surface.

In certain embodiments, the matrix polymer includes a polydimethylsiloxane elastomer, an epoxy, a polyurethane or a fluorinated polyurethane.

In certain embodiments, the amphiphilic copolymer can include a polyethylene glycol copolymer. For example, the polymer composition can includes less than 10%, less than 5%, less than 3%, or about 1% of the polyethylene glycol copolymer. In certain embodiments, the polyethylene glycol copolymer can include a polysiloxane-polyethylene glycol copolymer. The matrix polymer can include polydimethylsiloxane.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 5A shows the increased thickness (D) of the water depletion layer leading to reduced van der Waal's interaction between the ice and the hydrophobic surface. FIG. 5B shows non-frozen quasi-liquid-layer (QLL) on a PDMS+PDMS-PEG surface lubricating the contact and reducing the adhesion strength between ice and the solid surface.

FIGS. 7A-7B show $^1$H spectra of PDMS+water (FIG. 7A) and PDMS+PDMS-PEG+water (FIG. 7B) collected between 276 K and 253 K. The dominant water peaks used for analysis of relaxation times are labeled A (FIG. 7A) and B (FIG. 7B). The PEG hydroxyl peak can be seen in FIG. 7B after magnifying the spectra greater than 500 fold. The peak labelled C in FIG. 7B is due to exchange of protons between water that is hydrogen bonded to PEG and the PEG hydroxyl on a time scale that is faster than the NMR experiments conducted.

FIG. 12A shows the surface root-mean-square roughness is ~40 nm in the dry state. FIG. 12B shows the wet state surface root-mean-square roughness remains about 40 nm measured by tapping mode AFM in water. Scale bars represent 10 μm.

DETAILED DESCRIPTION

Figure 1:
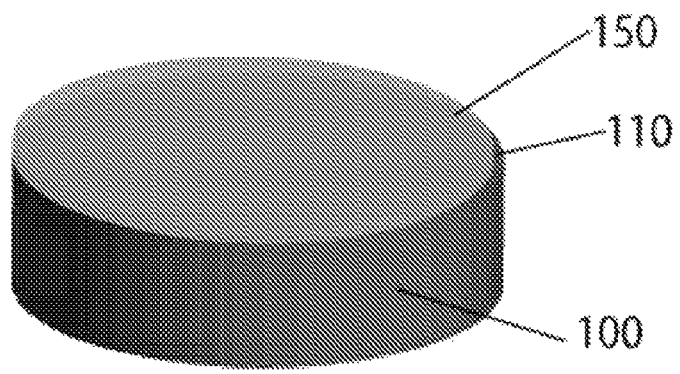
FIG. 1 is a schematic drawing of a coated article.

A common practice for deicing is to spray iced structures such as airplanes with deicing fluids that contain chemicals such as ethylene glycol. However this approach requires frequent applications, can be expensive and can be detrimental to the environment. Although some recently developed systems that employ porous coatings impregnated with freezing point depressants have led to moderate success in reducing the ice adhesion strength on a substrate, the impregnated liquids still suffer from drainage or washing away by the rain. See, Sun, X.; Damle, V. G.; Liu, S.; Rykaczewski, K., Bioinspired Stimuli-Responsive and Antifreeze-Secreting Anti-Icing Coatings. *Adv. Mater. Interfaces* 2015, 2. 1400479, and Ozbay, S.; Yuceel, C.; Erbil, H. Y., Improved Icephobic Properties on Surfaces with a Hydrophilic Lubricating Liquid. *ACS Appl. Mater. Interfaces* 2015, 7, 22067-22077, each of which is incorporated by reference in its entirety. This approach can reduce the frequency of reapplication of the impregnated deicing liquids. Researchers have also designed slippery, liquid-infused porous surfaces (SLIPS) with low surface tension liquid layer present as the lubrication layer, which leads to anti-icing and antifrost surfaces. See, Wilson, P. W.; Lu, W.; Xu, H.; Kim, P.; Kreder, M. J.; Alvarenga, J.; Aizenberg, J., Inhibition of Ice Nucleation by Slippery Liquid-Infused Porous Surfaces (SLIPS). *Phys. Chem. Chem. Phys.* 2013, 15, 581-585, which is incorporated by reference in its entirety. Recently, researchers have prepared organogels, e.g., silicone elastomers imbibed with organic solvents or silicone oils, for icephobic coatings, yielding remarkable low ice adhesion values. See, Zhu, L.; Xue, J.; Wang, Y.; Chen, Q.; Ding, J.; Wang, Q., Ice-Phobic Coatings Based on Silicon-Oil-Infused Polydimethylsiloxane. *ACS Appl. Mater. Interfaces* 2013, 5, 4053-4062, Urata, C.; Dunderdale, G. J.; England, M. W.; Hozumi, A., Self-Lubricating Organogels (SLUGs) with Exceptional Syneresis-Induced Anti-Sticking Properties against Viscous Emulsions and Ices. *J. Mater. Chem. A* 2015, 3, 12626-12630, Golovin, K.; Kobaku, S. P.; Lee, D. H.; DiLoreto, E. T.; Mabry, J. M.; Tuteja, A., Designing Durable Icephobic Surfaces. *Sci. Adv.* 2016, 2, e1501496, and Kim, P.; Wong, T.-S.; Alvarenga, J.; Kreder, M. J.; Adorno-Martinez, W. E.; Aizenberg, J., Liquid-Infused Nanostructured Surfaces With Extreme Anti-Ice and Anti-Frost Performance. *ACS Nano* 2012, 6, 6569-6577, each of which is incorporated by reference in its entirety. However, for both SLIPS and organogels, the mechanical robustness of these coatings and liquid retention within these coatings remain to be improved. See, Urata, C.; Dunderdale, G. J.; England, M. W.; Hozumi, A., Self-Lubricating Organogels (SLUGs) with Exceptional Syneresis-Induced Anti-Sticking Properties against Viscous Emulsions and Ices. *J. Mater. Chem. A* 2015, 3, 12626-12630, and Subramanyam, S. B.; Rykaczewski, K.; Varanasi, K. K., Ice Adhesion on Lubricant-Impregnated Textured Surfaces. *Langmuir* 2013, 29, 13414-13418, each of which is incorporated by reference in its entirety.

A more appealing approach is to design surface coatings that have robust anti-icing properties without need for reapplication. Ideally ice has minimal adhesion strength on these coatings such that the formed ice can be removed by its own weight or other additional natural forces such as wind. Exploring this approach, Meuler et al. have studied the relationship between water wettability and ice adhesion. See, Meuler, A. J.; Smith, J. D.; Varanasi, K. K.; Mabry, J. M.; McKinley, G. H.; Cohen, R. E., Relationships between Water Wettability and Ice Adhesion. *ACS Appl. Mater. Interfaces* 2010, 2, 3100-3110, which is incorporated by reference in its entirety. The practical work of adhesion for water is characterized by the water receding contact angle as $w_p = \gamma_{LV}(1+\cos \theta_{rec})$, where $w_p$ is the practical work of adhesion for water on a surface, $\gamma_{LV}$ is the surface tension of water, and $\theta_{rec}$ is the receding water contact angle. See, Meuler, A. J.; Smith, J. D.; Varanasi, K. K.; Mabry, J. M.; McKinley, G. H.; Cohen, R. E., Relationships between Water Wettability and Ice Adhesion. *ACS Appl. Mater. Interfaces* 2010, 2, 3100-3110, and Gao, L.; McCarthy, T. J., Teflon is hydrophilic. Comments on Definitions of Hydrophobic, Shear versus Tensile Hydrophobicity, and Wettability Characterization. *Langmuir* 2008, 24, 9183-9188, each of which is incorporated by reference in its entirety. Meuler et al. found that the average strength of ice adhesion varies nearly linearly with the practical work of adhesion for the liquid water, which suggests that maximizing the receding water contact angle minimizes the ice adhesion. In Meuler et al, the lowest ice adhesion is achieved by a coating that contains fluorodecyl polyhedral oligomeric silsesquioxane (Fluorodecyl POSS) and poly(ethyl methacrylate) (20:80 percent by weight), which has the largest receding contact angle ($\theta_{rec}=117\pm1°$) measured on smooth hydrophobic surfaces. However Fluorodecyl POSS molecule is expensive to synthesize and may also have an environmental impact. Further reduction in ice adhesion strength requires the introduction of surface roughness to a hydrophobic surface, leading to a superhydrophobic surface. See, Lazauskas, A.; Guobienė, A.; Prosyčevas, I.; Baltrušaitis, V.; Grigaliūnas, V.; Narmontas, P.; Baltrusaitis, J., Water Droplet Behavior on Superhydrophobic $SiO_2$ Nanocomposite Films during Icing/Deicing Cycles. *Mater. Charact.* 2013, 82, 9-16, Kulinich, S.; Farhadi, S.; Nose, K.; Du, X., Superhydrophobic Surfaces: Are They Really Ice-Repellent? *Langmuir* 2010, 27, 25-29, and Boinovich, L. B.; Emelyanenko, A. M.; Ivanov, V. K.; Pashinin, A. S., Durable Icephobic Coating for Stainless Steel. *ACS Appl. Mater. Interfaces* 2013, 5, 2549-2554, each of which is incorporated by reference in its entirety. However, a superhydrophobic surface tends to lose its surface texture during repeating deicing events, and it can also significantly enhance ice adhesion if ice is growing into the surface texture. See, Kulinich, S.; Farhadi, S.; Nose, K.; Du, X., Superhydrophobic Surfaces: Are They Really Ice-Repellent? *Langmuir* 2010, 27, 25-29, Varanasi, K. K.; Deng, T.; Smith, J. D.; Hsu, M.; Bhate, N., Frost Formation and Ice Adhesion on Superhydrophobic Surfaces. *Appl. Phys. Lett.* 2010, 97, 234102, Sojoudi, H.; Wang, M.; Boscher, N.; McKinley, G.; Gleason, K., Durable and Scalable Icephobic Surfaces: Similarities and Distinctions from Superhydrophobic Surfaces. *Soft Matter* 2016, 12, 1938-1963, and Maitra, T.; Jung, S.; Giger, M. E.; Kandrical, V.; Ruesch, T.; Poulikakos, D., Superhydrophobicity vs. Ice Adhesion: The Quandary of Robust Icephobic Surface Design. *Adv. Mater. Interfaces* 2015, 2.1500330, each of which is incorporated by reference in its entirety.

It is known that water can exist in a non-frozen state below the normal freezing point 0° C. See, Rosenberg, R., Why Is Ice Slippery? *Physics Today* 2005, 58, 50-55, which is incorporated by reference in its entirety. Polar fishes and insects produce antifreeze-proteins (AFPs) that bind the surfaces of nascent ice crystals, preventing further growth at temperatures within a characteristic thermal hysteresis range. See, Garnham, C. P.; Campbell, R. L.; Davies, P. L., Anchored Clathrate Waters Bind Antifreeze Proteins to Ice. *Proc. Natl. Acad. Sci. U.S.A.* 2011, 108, 7363-7367, which is incorporated by reference in its entirety. Therefore those fishes and insects can survive the icy cold climates. Researchers have been attaching AFPs to different substrates to achieve anti-icing effect, however AFPs are expensive, and tend to denature and lose their functions under acidic pH or high temperature. See, Esser-Kahn, A. P.; Trang, V.; Francis, M. B., Incorporation of Antifreeze Proteins into Polymer Coatings Using Site-Selective Bioconjugation. *J. Am. Chem. Soc.* 2010, 132, 13264-13269, Gwak, Y.; Park, J.-i.; Kim, M.; Kim, H. S.; Kwon, M. J.; Oh, S. J.; Kim, Y.-P.; Jin, E., Creating Anti-icing Surfaces via the Direct Immobilization of Antifreeze Proteins on Aluminum. *Sci. Rep.* 2015, 5, 12019, and Hederos, M.; Konradsson, P.; Borgh, A.; Liedberg, B., Mimicking the Properties of Antifreeze Glycoproteins: Synthesis and Characterization of a Model System for Ice Nucleation and Antifreeze Studies. *J. Phys. Chem. B* 2005, 109, 15849-15859, each of which is incorporated by reference in its entirety. The ice adhesion strength on such surfaces has not been tested. These attributes limit the use of AFPs for practical anti-icing surface coating. Therefore it is very attractive to explore the use of inexpensive synthetic polymers that have the capability to bind significant amounts of water that does not freeze at and below 0° C. The design of coatings containing these synthetic polymers could produce a thin layer of unfrozen water at the interface between ice and the underlying substrate. Essentially the layer of non-freezing water will serve as a lubrication layer to reduce ice adhesion strength. This approach may be advantageous compared to SLIPS or organogels coatings, in which lubricating liquids need be externally reapplied periodically. Researchers have synthesized polymers, such as cross-linked poly(acrylic acid), that can bind strongly with water molecules. These polymers have shown initial success in reducing the ice adhesion strength. See, Hederos, M.; Konradsson, P.; Borgh, A.; Liedberg, B., Mimicking the Properties of Antifreeze Glycoproteins: Synthesis and Characterization of a Model System for Ice Nucleation and Antifreeze Studies. *J. Phys. Chem. B* 2005, 109, 15849-15859, Dou, R.; Chen, J.; Zhang, Y.; Wang, X.; Cui, D.; Song, Y.; Jiang, L.; Wang, J., Anti-Icing Coating with an Aqueous Lubricating Layer. *ACS Appl. Mater. Interfaces* 2014, 6, 6998-7003, Chen, J.; Dou, R.; Cui, D.; Zhang, Q.; Zhang, Y.; Xu, F.; Zhou, X.; Wang, J.; Song, Y.; Jiang, L., Robust Prototypical Anti-Icing Coatings with a Self-Lubricating Liquid Water Layer between Ice and Substrate. *ACS Appl. Mater. Interfaces* 2013, 5, 4026-4030, and Chernyy, S.; Järn, M.; Shimizu, K.; Swerin, A.; Pedersen, S. U.; Daasbjerg, K.; Makkonen, L.; Claesson, P.; Iruthayaraj, J., Superhydrophilic Polyelectrolyte Brush Layers with Imparted Anti-Icing Properties: Effect of Counter Ions. *ACS Appl. Mater. Interfaces* 2014, 6, 6487-6496, each of which is incorporated by reference in its entirety. However, the existence of non-frozen water at the interface has only been speculated. These polymers usually also involve multistep synthesis processes and can only be applied to certain substrates to restrict swelling. There is thus an unmet demand for anti-icing polymer coatings that can be applied readily to a wide variety of substrates and that can be readily scaled up to cover large surface areas. Such polymer coatings should significantly reduce ice adhesion on the substrate and also must be affordable.

Disclosed herein is a scalable, self-lubricating icephobic coating by utilizing commercially-available amphiphilic copolymers embedded in a polymer coating matrix. When comparing ice adhesion measurements on this new low ice adhesion coating system with the previously established hydrophobic low ice adhesion coating system, the different molecular mechanisms are responsible for low ice adhesion on these two different classes of surfaces.

FIG. 1 schematically shows article 100 having a coating 150 on a surface 110. Coating 150 can include small amounts (less than 10%, less than 5% or less than 3%) of amphiphilic copolymers. The amphiphilc copolymer can be blended with a matrix polymer.

Some examples of amphiphilic copolymers include polymers having both hydrogen bonding functional groups and ionized or ionizable functional groups. For example, the amphiphilic copolymer can include a polyethylene glycol copolymer, for example, a polysiloxane-polyethylene oxide copolymer, a poly(isobutylene-b-ethylene oxide), a poly(butadiene-b-ethylene oxide), or a poly(butadiene-b-acrylamide)). The copolymers can be, for example, random copolymers, block copolymers, graft copolymers, or other copolymer.

The matrix polymer can be a silicone, for example, a polyalkylsiloxane (e.g., polydimethylsiloxane (PDMS)), a polymethacrylate (e.g., polymethylmethacrylate (PMMA), a polyethylmethacrylate (PEMA), a polybutylmethacrylate (PBMA), a polyvinylphenol (PVP), a polystyrene (PS), a gum (e.g., guar gum), an Epoxy, a polyurethane, or a fluorinated polyurethane. In certain circumstances, the matrix polymer is an elastomer. For example, the matrix polymer can be a PDMS elastomer.

A coating of this type can be applied to any surface amenable to a solution-based adsorption process, for example, a layer-by-layer deposition methodology, dipping or spraying. Because the solution-based process can deposit polymers wherever the solution contacts a surface, even the inside surfaces of objects having a complex topology can be coated.

Robust anti-icing polymer coatings have been developed using small amounts of amphiphilic copolymers. Such coatings can be applied to the surfaces of different structures such as airplanes, ships, wind turbines, power lines, vehicles, buildings and solar panels. These polymer coatings are thin polymer films that can be spin-coated, sprayed, flow-coated, or painted on a surface out of viscous polymer solutions or melts, and subsequently solidified, cured, or cross-linked. These polymers can include silicone rubbers, epoxy resins, polyurethanes and fluoro-polyurethanes, and other polymers that are typically used in top coatings. A small amount of polydimethylsiloxane (PDMS)-poly(ethylene glycol) (PEG) copolymer or other amphiphilic copolymers is blended into the above polymer solutions and melts prior to coating and curing. These coatings decrease the adhesion of ice to the substrate and/or retard the formation of ice such that the energy required to remove the ice from the substrate can be reduced.

Another objective of this disclosure is to describe a method for robust anti-icing surfaces throughout repeated icing events. The small amount polydimethylsiloxane (PDMS)-poly(ethylene glycol) (PEG) copolymers or other amphiphilic copolymers incorporated in the polymer coats serve as the active component for binding water molecules in a non-freezing state. This binding leads to a thin non-frozen water layer at the ice/solid-substrate interface, which helps to reduce the ice adhesion strength. Polydimethylsiloxane (PDMS)-poly(ethylene glycol) (PEG) copolymers with certain compositions have no solubility in water, and this advantageous property helps to eliminate the chance of the removal of the active component by rain, which is often mixed with snow and ice in precipitation. Blending the active component within a polymer matrix provides a mechanism for spontaneously replenishing the new exposed surface with the ice/water binding molecules even when the polymer matrix is under mechanical abrasion.

Anti-icing behavior described herein can be assessed using the methodology proposed by Meuler et al. for testing the ice adhesion on a substrate. This method comprises the steps of:

1) A thin polymer film containing 1-5 wt % polydimethylsiloxane (PDMS)-poly(ethylene glycol) (PEG) copolymers is spin-coated on a clean 1×1 inch silicon substrate and subsequently cured completely.

2) These coated substrates are first clamped to a custom-built base plate.

3) Water columns with the contact area of 1×1 cm with the coated substrate are prepared by pouring deionized water in cuvettes and inverting the half-filled cuvettes with the help of a sample holder to preventing leaking.

4) The assembly is mounted on top of a liquid-cooled Peltier cooling plate (−15° C.) to induce ice formation.

5) The ice adhesion strength is recorded by a force transducer as the maximum force required for detaching each ice column from its test substrate by pushing the side of the cuvette at a constant speed of 0.1 mm/s.

The measured ice adhesion strength is reported in the format of an average value±standard deviation that is averaged among at least three different samples in the same test condition. Following the empirical relationship proposed by Meuler et al., the measured ice adhesion strength is plotted as a function of the practical work of adhesion for water. Polymer coatings that incorporate a small amount of polydimethylsiloxane (PDMS)-poly(ethylene glycol) (PEG) copolymers show low ice adhesion, and the behavior of these coatings deviates significantly from the tightly correlated empirical relationship found by Meuler et al. This dramatic deviation indicates that different mechanisms of ice adhesion are coming into play and suggests that there is unexplored design space for achieving low ice adhesion surfaces.

The active component that is blended in the polymer coating and leads to low ice adhesion can be a polydimethylsiloxane (PDMS)-poly(ethylene glycol) (PEG) copolymer, which has the following structure, wherein R is hydroxyl or oxymethyl group. The repeating unit of the grafted chain is primarily ethylene glycol, but can be partially substituted by propylene glycol.

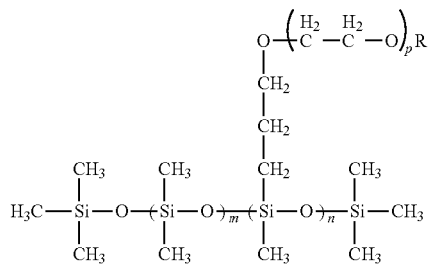

The active polydimethylsiloxane (PDMS)-poly(ethylene glycol) (PEG) copolymer is blended into polymer coating materials including polydimethylsiloxane (PDMS) elastomer (Sylgard 184, Dow Corning, Auburn Mich.), epoxy resin (PB140653, Epoxy Technology Inc. Billerica, Mass.), polyurethane (Clear flex 95, Smooth-on Inc. Macungie Pa.), fluoro-polyurethane (Luxecolor 4FVBA-800, Helicity Technologies, Inc. Acworth, Ga.) and other polymer coatings. The blending ratio of the active copolymer is 1-5% by weight.

The effectiveness of the active copolymer is studied by incorporating four PEG-PDMS copolymers that have different molecular weights and compositions, into PDMS elastomer coating at either 1% or 5% by weight. The most effective PEG-PDMS copolymer is identified and used in other polymer coatings.

The polymer coatings are spinning coated onto clean silicon substrates (1×1 inch) out of the precursor or mixed precursor, without solvent dilution unless the precursor is too viscous when dilution is necessary.

Apart from polymer coatings that incorporate PEG-PDMS copolymers as active component for low ice adhesion surfaces, other types of polymer coatings are also prepared by spin coating out of polymer solutions onto clean silicon substrates (1×1 inch).

These polymer coatings are completely dried, cured, or crosslinked, prior to ice adhesion test, by room temperature curing, oven baking or exposure to UV light depending on the specific polymer in use.

To plot the ice adhesion strength as a function of the practical work of adhesion for water, a variety of polymer coatings, as listed in Table 1 and Table 3, are prepared. The preparation procedures are described below.

To plot the ice adhesion strength as a function of the practical work of adhesion for water, contact angles of deionized water (18 MO/cm, Millipore) on polymer coatings are measured using a ramé-hart Model 590 goniometer. Advancing angles ($\theta_{adv}$) are measured as water is supplied via a syringe while receding angles ($\theta_{rec}$) are measured as water is removed via a syringe. Measurements are taken over three or more different locations on each surface, and the reported values are listed in Table 1 and Table 3 in the format of average±standard deviation.

TABLE 1

Measured Water Contact Angles and Average Shear Strengths of Ice Adhesion

| Surfaces | Advancing Angle ($\theta_{adv}$) | Receding Angle ($\theta_{rec}$) | Ice adhesion Strength (kPa) |
| --- | --- | --- | --- |
| Clean silicon wafer | 35 ± 1° | 10 ± 2° | 869 ± 43 |
| PEMA | 79 ± 1° | 67 ± 1° | 672 ± 47 |
| PEMA-POSS (80/20) | 122 ± 1° | 117 ± 1° | 151 ± 5 |
| PMMA | 105 ± 1° | 64 ± 1° | 737 ± 154 |
| PBMA | 89 ± 1° | 73 ± 1° | 519 ± 4 |
| PDMS 10:1 | 118 ± 1° | 82 ± 2° | 317 ± 16 |
| PDMS 10:1 + PDMS-PEG* | 112 ± 2° | 70 ± 1° | 117 ± 7 |
| PS | 92 ± 2° | 82 ± 2° | 683 ± 44 |
| PVP | 74 ± 1° | 9 ± 2° | 902 ± 62 |
| PS-PEG | 83 ± 1° | 60 ± 1° | 558 ± 18 |
| Guar gum | 51 ± 1° | 0° | 1321 ± 11 |

*PDMS-PEG copolymer is CMS-626 (Gelest Inc.), blended into a PDMS elastomer film at 1 wt % ratio.

Silicon wafers are purchased from University Wafer, cut into 1×1 inch squares, cleaned with acetone and ethanol, dried in a stream of air prior to the coating step.

Poly(ethyl methacrylate) (PEMA, Mw=515 kg/mol, Sigma-Aldrich), poly (methyl methacrylate) (PMMA, Mw=540 kg/mol, Scientific Polymer Products), poly(n-butyl methacrylate) (PBMA, Mw=337 kg/mol, Sigma-Aldrich), Fluorodecyl polyhedral oligomeric silsesquioxane (POSS, a gift from NBD Nanotechnologies Inc.) and Asahiklin (AK225, Asahi Glass Company, Tokyo Japan) are used as received. Polymer solutions (with a solid concentration of 20 mg/mL) are prepared by dissolving PEMA, PMMA, PBMA, and the PEMA/fluorodecyl POSS mixture (80:20 by weight) in Asahiklin, respectively. Thin (~200-300 nm) coatings are deposited at room temperature on silicon substrates via a spin coating process. About 0.2 mL of a polymer solution is placed on top of each substrate and the sample is spun at 1,000 rpm for 30 s. Then the coated samples is thermally annealed at 60° C. for at least 2 h.

Polydimethylsiloxane (PDMS) elastomer precursor (Sylgard 184) is obtained from Dow Corning, Auburn Mich. Polydimethylsiloxane (PDMS)-poly(ethylene glycol) (PEG) copolymer (CMS-226) is obtained from Gelest Inc. For the PDMS elastomer coating, Sylgard 184 base and cross-linker are mixed thoroughly in a 10:1 ratio by weight, followed by degassing via vacuum to remove bubbles, and spin-coating at 2000 rpm for 60 s to reach a thickness of about 20 micron. The spin-coated samples are then baked at 80° C. for 24 h to achieve complete curing. For PDMS+PDMS-PEG film, all the processing conditions are the same except 1% in weight PDMS-PEG is blending in the PDMS elastomer precursor in the mixing step. The final film thickness of PDMS+PDMS-PEG is also about 20 micron.

Polystyrene (PS, Mw=35,000, Sigma-Aldrich), poly(vinyl phenol) (PVP, Mw=25,000, Sigma-Aldrich), and poly (styrene-b-ethylene oxide) (PS-PEO, Mn=51,000-b-11,500, Polymer Source) are used as received. PS and PS-PEO are dissolved in toluene (Sigma-Aldrich) to prepare 3 wt % PS and PS-PEO solutions, respectively. PVP is dissolved in 1,4-dioxane (Sigma-Aldrich) to prepare a PVP solution with a solid concentration of 3 wt %. About 0.2 mL of one solution is placed on top of each clean silicon substrate and the sample is spun at 1,000 rpm for 30 s. The achieved film thickness is about 100 nm. These samples are dried in a vacuum oven to completely remove the solvent.

For guar gum coated samples, the silicon substrates are first treated with oxygen plasma (PDC-32G, Harrick Scientific Products, Inc.) for 10 min at 150 mTorr. After this step, these substrates are immersed in a methyl ethyl ketone (MEK, 99+% A.C.S. reagent, Sigma-Aldrich) solution containing 0.1% (w/v) poly(glycidyl methacrylate) (PGMA, $M_w$=25 kDa, Polysciences) for 20 s. These samples are then placed in a 110° C. oven for 30 min to covalently bond PGMA to the substrate. After cooling to ambient temperature, the PGMA-coated substrates are immersed in a 20 mg/mL aqueous solution of gaur gum (G4129, obtained from Sigma-Aldrich) for 20 min. The guar gum coated substrates are dried at ambient temperature and again placed in the oven at 110° C. for 30 min to induce a chemical reaction between the residual epoxy groups present in PGMA and the hydroxyl groups on guar.

Figure 2:
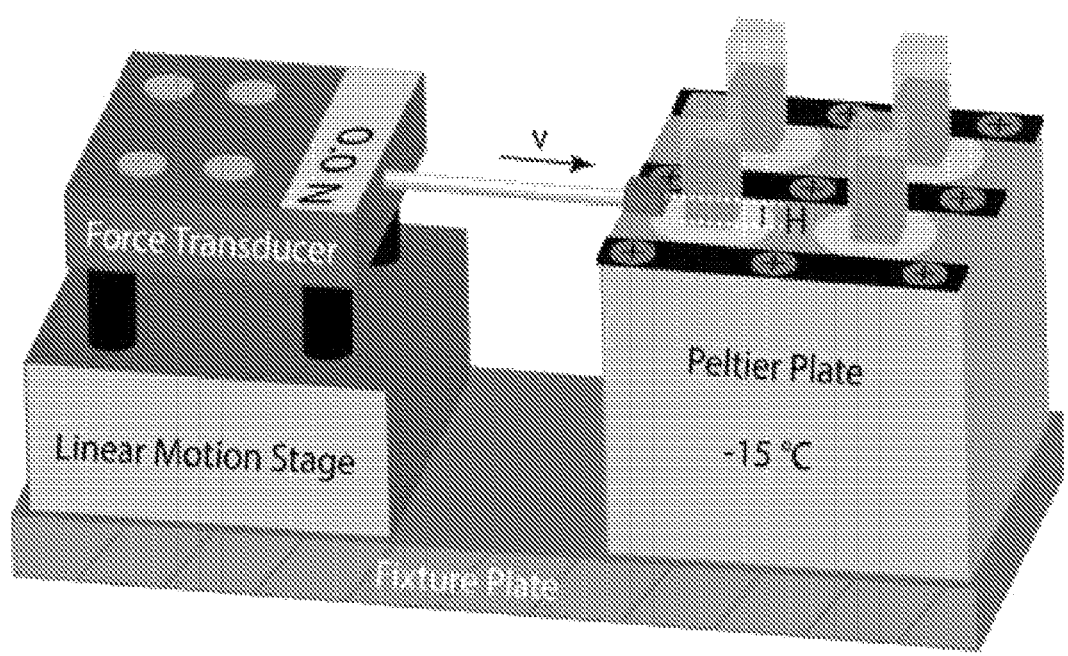
FIG. 2 is a schematic illustration showing ice adhesion apparatus setup.

The ice adhesion test performed is essentially a fracture problem. The ice adhesion strength as measured by the maximum force depends on how the crack propagates—the modes of cracking. In the experimental setup, the fracture occurs in a combination of Mode 1 crack (a tensile stress normal to the plane of the crack) and Mode 2 crack (a shear stress acting parallel to the plane of the crack and perpendicular to the crack front). The ratio depending on the distance "H" between applied force and ice-substrate interface, as illustrated in FIG. 2. In the current tests, it is kept that a constant H=1 mm.

Figure 11:
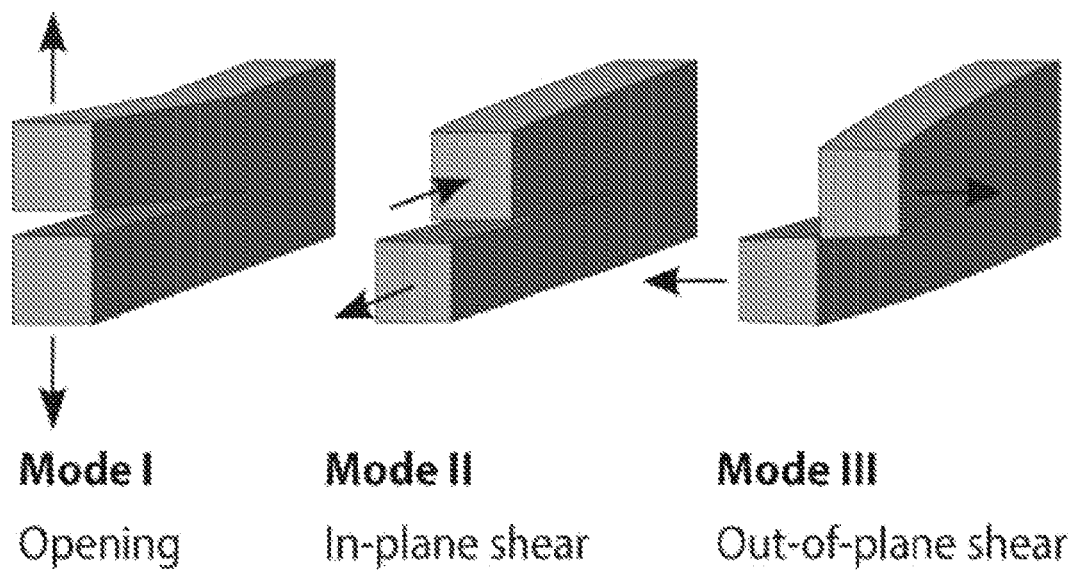
FIG. 11 is a schematic drawing of three modes of fracture. Using the current ice adhesion test apparatus as illustrated in FIG. 2, the ice cubes detach from the surface mostly by Mode II (in-plane shear) fracture.

At least three or more samples for each type of polymer coatings are prepared and the ice adhesion is tested on these samples under the same condition (−15° C.) throughout the experiment. The ice adhesion strength is recorded by a force transducer as the maximum force (normalized by the ice-surface contact area) required for detaching each ice column from its test substrate by pushing the side of the cuvette at a constant speed of 0.1 mm/s. The measured ice adhesion strength is reported in the format of an average value±standard deviation, as listed in Table 1. The samples are prepared by the spin coating method, so the samples have rather smooth surfaces with root-mean-square roughness values in the range of a few nanometers, except for the PDMS+PDMS-PEG surfaces which have slightly larger root-mean-square surface roughness of ~40 nm. The small variation in surface roughness has negligible effect on the water contact angles (The Wenzel roughness is smaller than 1.06 for all surfaces). How the roughness influences the ice adhesion strength will be discussed later. Other than thermal melting of ice from the surfaces, removing ice from a surface is essentially a fracture problem. Using the same ice adhesion test apparatus as in Meuler et al. as shown in FIG. 2, the frozen sample of area 1×1 $cm^2$ is pushed off a surface by a linear stage and record the maximum force for fracturing the ice. The ice adhesion strength as measured by the maximum force depends on how the crack propagates—the modes of cracking (Three modes of fracture are depicted in FIG. 11). In the experimental setup, the fracture occurs in a combination of Mode I crack (a tensile stress normal to the plane of the crack) and Mode II crack (a shear stress acting parallel to the plane of the crack and perpendicular to the crack front). The ratio depends on the distance "H" between the applied force and the ice-substrate interface, as illustrated in FIG. 2. In the current tests, it is maintained a small and constant H=1 mm. In this small gap limit, the fracture is primarily Mode II crack. The average strength of ice adhesion is defined as the maximum fracture force divided by the ice-substrate contact area. Notably, a PDMS elastomer film containing 1 wt % PDMS-PEG copolymer (CMS-626, Gelest Inc.) shows a remarkably low value of the ice adhesion strength, which is even lower than that on the PEMA/POSS surface, i.e., the lowest ice adhesion value previously achieved on smooth, hydrophobic solid surfaces, although the PDMS+PDMS-PEG surface has a much lower water receding angle. The samples were allowed to freeze for at least 3 h before performing the ice adhesion measurements. Ice adhesion strength was tested for the same surfaces after freezing time in the range of 3-8 h and no significant difference was observed. However, whether the ice adhesion strength will change over significantly longer freezing times (on the order of days) remains to be tested.

The first active PDMS-PEG copolymer in investigation is CMS-226 obtained from Gelest Inc. As listed in Table 2, this copolymer has a relatively low molecular weight and high ethylene glycol composition. These attributes lead to a good water solubility of this copolymer, which may affect the durability of the achieved low ice adhesion coatings. To improve the long-term effectiveness and explore the influence of the molecular composition, other three PDMS-PEG copolymers as tabulated in Table 2 are also investigated. These PDMS-PEG copolymers are also obtained from Gelest Inc. without further treatment. They are varying in the PEG composition, glycol capping functional group (—R), viscosity, molecular weight and water solubility. In two of the copolymers, ethylene glycol segments are partially substituted by propylene glycol, as noted in Table 2. The copolymers that have high compositions in EG or EG/PG is soluble in water while those with low EG or EG/PG compositions have no solubility in water.

Sylgard 184 base and cross-linker are mixed thoroughly in a 10:1 weight ratio, together with 1% or 5% PDMS-PEG copolymers by weight. After the mixing, the precursor is spin-coated at 2000 rpm for 60 s to reach a thickness of about 20 micron. The spin-coated samples are then baked at 80° C. for 24 h to achieve complete curing. For CMS-626 and DBP-732, blending 1 or 5 wt % PDMS-PEG barely changes the viscosity of the PDMS elastomer precursor so no dilution is necessary for achieving the same film thickness by applying the same spin-coating parameters. For CMS-221 and DBE-224, significantly increase in viscosity of PDMS elastomer precursor is observed. So the mixture is diluted with chloroform (Sigma-Aldrich) to a concentration of 40-60% by weight so the same film thickness of about 20 micron is achieved with the same spin-coating parameters.

Advancing and receding contact angles of deionized water (18 MΩ/cm, Millipore) on these polymer coatings are measured using a ramé-hart Model 590 goniometer. Ice adhesion measurement is taken over three or more different samples using the experimental setup as illustrated in FIG. 2. Coated substrates were mounted to a Peltier cooling plate whose surface was thermostatted at a target temperature (−15° C.). Plastic cuvettes (10 mm×10 mm×45 mm) filled with deionized water were inverted on the substrate surface and the water was frozen for at least 3 h before starting the ice adhesion test. The probe of the force transducer was propelled at 0.1 mm/s into the side of each cuvette until the ice column detached from the test surface, and the maximum fracture force is recorded.

The measured contact angles and ice adhesion strength are reported in Table 3. While the PDMS+PDMS-PEG coatings have advancing contact angles in a range of ~110-125°, and receding contact angles in a small range of ~60-85°, the contact angle hysteresis is large. This large contact angle hysteresis is due to the responsiveness of PDMS-PEG molecules, which have low glass transition temperature. In contact with air, PDMS moiety preferentially segregates to the surface to minimize the surface energy. When in contact with water, PEG moiety will segregate to the interface to lower the interfacial energy. Those coatings that contain 5 wt % PDMS-PEG have slightly lower receding contact angles in comparison to those coating 1 wt % PDMS-PEG. All these coating show low ice adhesion values. The coatings that contain water-soluble PDMS-PEG copolymers (CMS-626 and DBP-732) show higher ice adhesion strength than those that contain water-insoluble PDMS-PEG copolymers (CMS-221 and DBE-224). While no significant dependence of the ice adhesion strength on the loading ratio of PDMS-PEG copolymers is observed except for CMS-221. However incorporating 5 wt % CMS-221 into PDMS elastomer coating moderately reduces the mechanical robustness of the PDMS elastomer. Incorporating 1 wt % DBE-224 into PDMS elastomer coating leads to a low ice adhesion strength and only slightly change in the mechanical properties of the PDMS elastomer.

TABLE 2

Molecular Weight and Composition of PDMS-PEG Copolymers in Use

| Product code | Wt % Non-Siloxane | Glycol capping (R) | Viscosity cSt. | Molecular Weight | Water Solubility |
|---|---|---|---|---|---|
| CMS-626* | 65 | OH | 550-650 | 4,500-5,500 | Yes |
| DBP-732** | 65-70 | OMe | 1800 | 20,000 | Yes |
| CMS-221* | 20-25 | OH | 125-150 | 4,000 | No |
| DBE-224*** | 25 | OMe | 400 | 10,000 | No |

*100% EG,
**EG/PG (40/60),
***~10 mole % EG substituted

TABLE 3

Measured Water Contact Angles and Average Shear Strengths of Ice Adhesion for PDMS elastomer Coatings Containing PDMS-PEG Copolymers

| Surfaces | Advancing Angle ($\theta_{adv}$) | Receding Angle ($\theta_{rec}$) | Ice adhesion Strength (kPa) |
|---|---|---|---|
| PDMS 10:1 + 1 wt % CMS-626 | 112 ± 2° | 70 ± 1° | 117 ± 7 |
| PDMS 10:1 + 5 wt % CMS-626 | 126 ± 2° | 59 ± 1° | 94 ± 8 |
| PDMS 10:1 + 1 wt % DBP-732 | 112 ± 1° | 76 ± 1° | 181 ± 7 |
| PDMS 10:1 + 5 wt % DBP-732 | 126 ± 2° | 59 ± 2° | 180 ± 16 |
| PDMS 10:1 + 1 wt % CMS-221 | 122 ± 1° | 86 ± 1° | 99 ± 3 |
| PDMS 10:1 + 5 wt % CMS-221 | 126 ± 2° | 68 ± 1° | 46 ± 9 |
| PDMS 10:1 + 1 wt % DBE-224 | 120 ± 2° | 80 ± 2° | 57 ± 9 |
| PDMS 10:1 + 5 wt % DBE-224 | 126 ± 1° | 71 ± 1° | 51 ± 14 |

Figure 3:
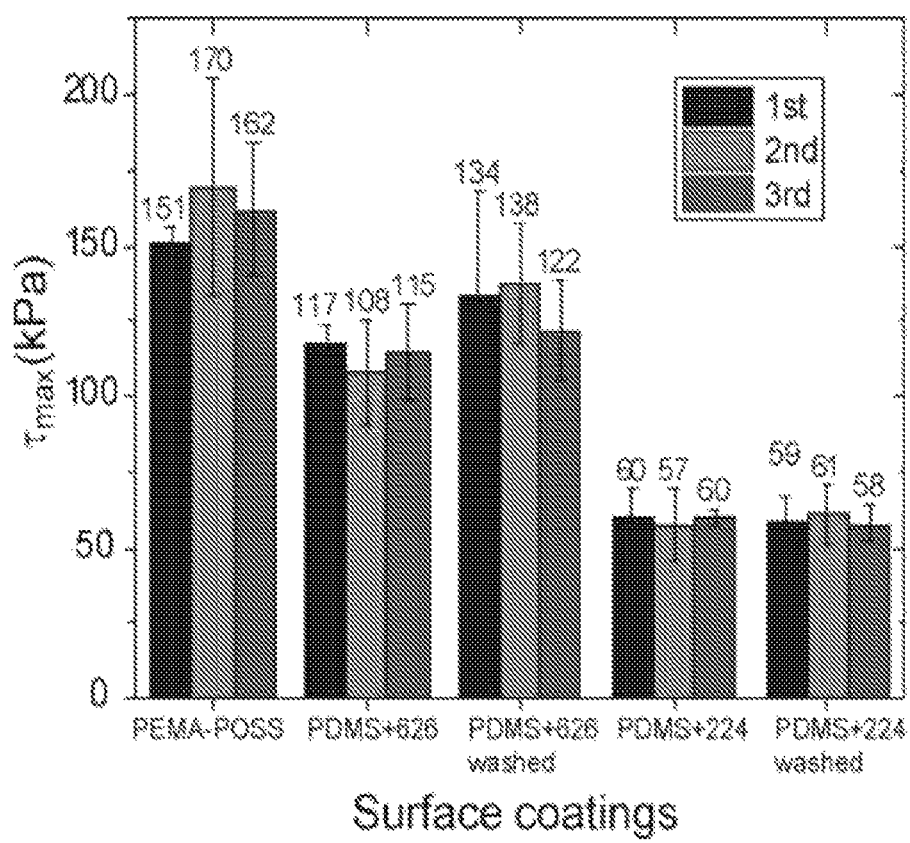
FIG. 3 is a graph depicting the ice adhesion strength is plotted as a function of the water contact angle parameter.

Compared to the common practice of using deicing fluids to remove ice from surfaces, one unique advantage of the passive coating approach is the reduction/elimination of reapplications during multiple icing events. Therefore, it is also critical for such passive coatings to have robust anti-icing performance during subsequent deicing tests. Ice adhesion strengths for different surfaces in 3 repeated icing tests are shown in FIG. 3. For all the surfaces tested, there were no significant changes in the ice adhesion strength after three separate trials. To test the long-term durability of the ice-phobic surfaces, many more icing/deicing cycles are required. See, Lazauskas, A.; Guobienė, A.; Prosyčevas, I.; Baltrušaitis, V.; Grigaliūnas, V.; Narmontas, P.; Baltrusaitis, J., Water Droplet Behavior on Superhydrophobic SiO$_2$ Nanocomposite Films during Icing/Deicing Cycles. Mater. Charact. 2013, 82, 9-16, Kulinich, S.; Farhadi, S.; Nose, K.; Du, X., Superhydrophobic Surfaces: Are They Really Ice-Repellent? Langmuir 2010, 27, 25-29, Boinovich, L. B.; Emelyanenko, A. M.; Ivanov, V. K.; Pashinin, A. S., Durable Icephobic Coating for Stainless Steel. ACS Appl. Mater. Interfaces 2013, 5, 2549-2554, and Kulinich, S.; Honda, M.; Zhu, A.; Rozhin, A.; Du, X., The Icephobic Performance of Alkyl-Grafted Aluminum Surfaces. Soft Matter 2015, 11, 856-861, each of which is incorporated by reference in its entirety. Lower ice adhesion (~50-110 kPa) was achieved on PDMS+PDMS-PEG coatings (PDMS+CMS-626 and PDMS+DBE-224) than on the PEMA-POSS coating (~150 kPa), on which the lowest ice adhesion for smooth, hydrophobic solid surfaces has been reported previously. Icing, snowing, and raining conditions often occur simultaneously, and are known collectively as a "wintry mix". Rainwater can extract and remove water-soluble PDMS-PEG copolymers from the coating, leading to deterioration in anti-icing properties. Indeed, the water washed PDMS+CMS-626 coating had a slightly higher ice adhesion strength than the non-washed counterparts, suggesting some removal of the active component (CMS-626) due to its water solubility. No apparent change in ice adhesion was observed for the PDMS+DBE-224 coating after washing owing to the water insolubility of DBE-224, which may help eliminate the need for reapplication.

Because of the wide range of possible test conditions and different definitions of icephobicity, surface characteristics can have contradictory effects on anti-icing performance. See, T Sojoudi, H.; Wang, M.; Boscher, N.; McKinley, G.; Gleason, K., Durable and Scalable Icephobic Surfaces: Similarities and Distinctions from Superhydrophobic Surfaces. *Soft Matter* 2016, 12, 1938-1963, which is incorporated by reference in its entirety. The ice adhesion strength can be influenced by surface elasticity (soft vs. hard), surface topography (smooth vs. rough), and liquid extent (dry vs. wet). All the surface coatings investigated are hard coatings (in a glassy state with a Young's modulus on the order of 1 GPa) except for the PDMS or PDMS+PDMS-PEG coatings, which are soft elastomers with a Young's modulus on the order of 1 MPa in freezing conditions thanks to the low glass transition temperature of PDMS (~–125° C.). If low ice adhesion strength is used as the criterion to define surface icephobicity, surface characteristics may affect the adhesion strength. According to the Griffith criterion for fracture, the fracture stress ($\tau_f$) is proportional to the square root of the composite modulus at the interface ($E^*$): $\tau_f \sim (E^*)^{1/2}$ 30. Therefore, lower modulus substrates give rise to lower ice adhesion strengths.

Figure 4:
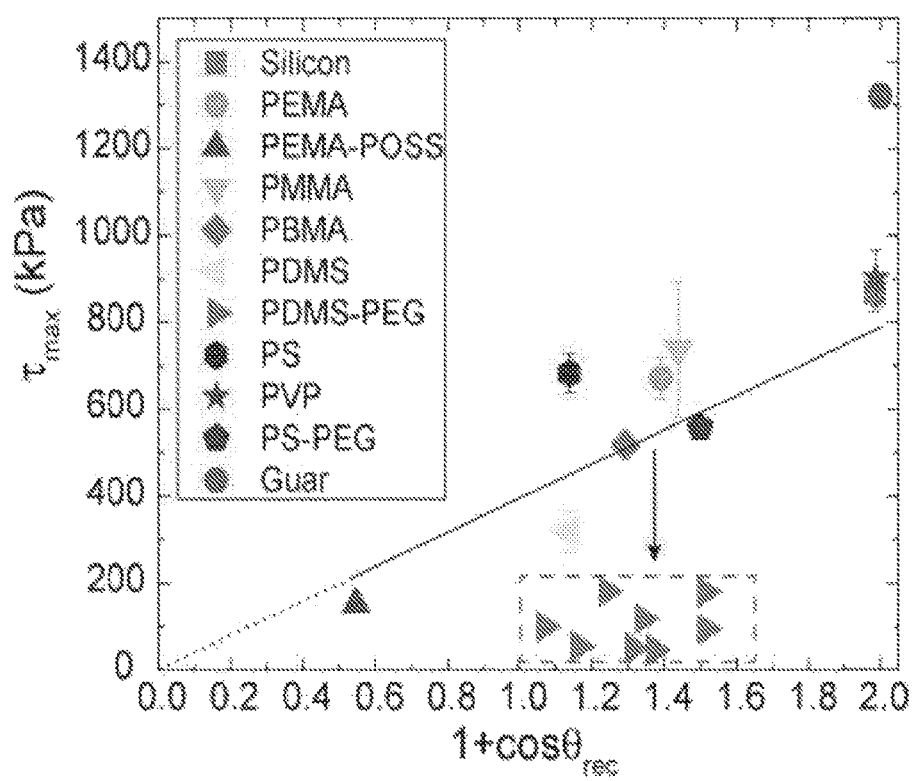
FIG. 4 is a graph depicting the ice adhesion strength is plotted as a function of the water contact angle parameter.

As shown in FIG. 4, the ice adhesion strength is plotted as a function of the practical work of adhesion for water for the 17 different polymer coatings as described above and a bare clean silicon substrate. All the data points listed in Table 1 and Table 3 are shown in FIG. 4. The empirical relationship between the ice adhesion strength and the practical work of adhesion for water proposed by Meuler et al. can well capture the test results, except for two sets of data points that are apparently off the trend line: the guar gum coated substrate and the PDMS-PEG coated substrates. Fitting of the rest 9 data points gives rise to a trend line ($\tau_{max}=(390\pm15\ kPa)(1+\cos\theta_{rec})$) This value of the prefactor is close (within 15% difference) to the value Meuler et al. obtained. Another group of data points show that the ice adhesion strengths on PDMS+PDMS-PEG coated substrates are significantly lower than what is predicted by the empirical linear trend line, as highlighted by the red, dashed rectangle. This dramatic reduction indicates that different mechanisms of ice adhesion are coming into play and suggests that there is a previously unexplored region of parameter design space for achieving low ice adhesion surfaces. The guar gum coating shows much higher ice adhesion strength than the trend. This is due to significant swelling of the guar gum layer by water, which increases the ice and polymer contact area and leads to cohesive fracture instead of adhesive fracture at the interface. After the removal of the ice cube from the surface, small pieces of ice remain adhere to the substrate. The PDMS+PDMS-PEG coated surfaces show remarkable low ice adhesion. The ice adhesion strength significantly deviates from the trend, and is even lower than the value achieved on PEMA-POSS. This result implies a new regime for designing low ice adhesion coatings. Moreover, the incorporation of only 1 wt % PDMS-PEG copolymer into PDMS elastomer coating reduces the ice adhesion to about ⅓ of the ice adhesion strength on pure PDMS elastomer.

The much lower ice adhesion strengths observed on PDMS+PDMS-PEG coatings with respect to those on the PDMS coating and the PEMA-POSS coating indicates that polyethylene glycol (PEG) is the active moiety for reducing the ice adhesion. The reason can be that there are some unfrozen water molecules present at the interface. PEG is known to hydrogen bond with water molecules. The hydrogen bonded water molecules form a hydration cage around the hydrophobic —CH2-CH2- segments, which gives rise to the good water solubility of PEG. These bonded water molecules are believed to form a quasi-liquid layer (QLL) that impedes ice nucleation and growth. QLL serves as a lubrication layer at the ice-substrate interface, and therefore reduces the ice adhesion strength on the substrates.

The effectiveness of these low ice adhesion coatings over repeated icing event is examined. As shown in FIG. 4, the ice adhesion tests are repeated on the same surfaces three times under the same test conditions. In FIG. 4, the ice adhesion strength is plotted as a function of the water contact angle parameter that scales with the practical work of adhesion for water for 17 different polymer coatings and a bare clean silicon wafer. The empirical relationship between the ice adhesion strength and the practical work of adhesion for water proposed by Meuler et al. can accurately capture the test results, except for two sets of data points that are apparently off the trend line: the guar gum coated substrate and the PDMS+PDMS-PEG coated substrates (8 different substrates represented by olive colored triangular symbols).

As shown in FIG. 4, soft substrates including the PDMS elastomer and PDMS+PDMS-PEG elastomer coatings have lower ice adhesion strengths than predicted by the linear trend described by Meuler et al. for smooth hydrophobic surfaces. Low-modulus PDMS elastomer coatings for low ice adhesion surfaces have been reported previously. See, Golovin, K.; Kobaku, S. P.; Lee, D. H.; DiLoreto, E. T.; Mabry, J. M.; Tuteja, A., Designing Durable Icephobic Surfaces. *Sci. Adv.* 2016, 2, e1501496, and Hoover, K.; Watson, C.; Putnam, J.; Dolan, R.; Bonarrigo, B.; Kurz, P.; Weisse, M., Erosion Resistant Anti-Icing Coatings. Patent US20070254170A1: 2007, each of which is incorporated by reference in its entirety. Adding a small amount of PDMS-PEG copolymers into the PDMS matrix can further significantly reduce the ice adhesion strength to values even lower than that of the hydrophobic PEMA/POSS surface. Another factor that influences the ice adhesion strength is the surface roughness. AFM measurements show that the Sylgard 184 PDMS (10:1 mixing ratio) film, prepared by spin-coating at 2000 rpm and subsequent fully-curing at 80° C., has a root-mean-square surface roughness of ~4 nm. Blending 1 wt % PDMS-PEG copolymer (DBE-224) in the Sylgard 184 PDMS and preparing the film with the same procedure, increases the root-mean-square surface roughness to ~40 nm (FIG. 12A) which is due to the phase separation between the PDMS matrix and the PDMS-PEG copolymers. Depending on which of the two effects described below is dominant, the increased surface roughness can either increase or decrease ice adhesion strength. It may contribute to the mechanical interlocking between the ice and the substrate and thereby increase the ice adhesion strength. See, Menini, R.; Farzaneh, M., Advanced Icephobic Coatings. *J. Adhes. Sci. Technol.* 2011, 25, 971-992, which is incorporated by reference in its entirety. On the other hand, it can seed interfacial adhesion defects and therefore help to reduce the fracture stress. See, Nosonovsky, M.; Hejazi, V., Why Superhydrophobic Surfaces Are Not Always Icephobic. *ACS Nano* 2012, 6, 8488-8491, which is incorporated by reference in its entirety. The third surface attribute that influences the ice adhesion strength is the extent of the coating liquid character (often referred to as "dry" vs. "wet" coating). Lw ice adhesion strength is measured on on two very different types of surfaces: the PEMA/POSS surface and the PDMS+ PDMS-PEG surfaces. The hydrophobic PEMA/POSS surface stays dry during the icing event, whereas the PDMS+ PDMS-PEG surfaces may become hydrated in the icing/deicing experiment due to the strong interaction between PEG and water molecules, implying markedly different icephobic mechanisms.

PEMA-POSS coating is tested together with two PDMS+ PDMS-PEG coatings: one containing water soluble CMS-626, and one containing water-insoluble DBE-224. For all the surfaces tested, there are no significant changes in the ice adhesion strength, indicating good durability of these surfaces. Lower ice adhesion has achieved on PDMS-PEG coatings (PDMS+626 and PDMS+224) than on PEMA-POSS coating. The ice adhesion strength on PDMS+224 coating is about 60 kPa in three repeated icing events. Washed PDMS+626 coating (PDMS 10:1+1 wt % CMS-626) has slightly higher ice adhesion strength than the non-washed counterparts, indicating the removal of the active component (CMS-626) due to its water solubility. No apparent change in ice adhesion is observed on the PDMS+ 224 coating (PDMS 10:1+1 wt % DBE-224) after washing, which may help eliminate the necessity of reapplication. Therefore, DBE-224 is established as the best PDMS-PEG copolymer as the active component for reducing ice adhesion.

For the washing of PDMS+PDMS-PEG coatings, samples with PDMS+PDMS-PEG coatings are immersed in a beaker containing 1 L of water on a bench top shaking stage for 3 days. The water is changed every 12 h.

While PDMS elastomer coatings incorporating PDMS-PEG copolymers show low ice adhesion, they are not typically used as coating materials applied to airplanes, ships, wind turbines, power lines, vehicles, buildings and solar panels. To explore the effectiveness of the current strategy, 1 wt % DBE-224 PDMS-PEG copolymer is blended into epoxy resin, polyurethane, or fluoro-polyurethane, which are typically used as hard coating, top coating or anti-reflection coating in the aforementioned structures. The 1 wt % DBE-224 doesn't appreciably change the mechanical properties of these coating.

Epoxy resin (PB140653, Epoxy Technology Inc. Billerica, Mass.) is mixed thoroughly with 1 wt % DBE-224 before spin coating onto a clean silicon substrate (1×1 inch) at 2000 rpm for 60 s. The as-spun samples are then cured by UV exposure for 90 s with Dymax ECE 5000 flood UV lamp. Pure epoxy resin is processed in the same condition to prepare the control samples.

Polyurethane precursor (Clear flex 95, Smooth-on Inc. Macungie Pa.) is mixed in a A:B=1:1.5 weight ratio, together with 1 wt % DBE-224. The mixture is degassed using vacuum pump to remove the bubbles introduced during the mixing step. Next, the mixture is spin coated on clean silicon substrates at 2000 rpm for 60 s. Then these samples are cured for 24 h at room temperature followed for another 6 h at 60° C. Pure polyurethane is processed in the same condition to prepare the control samples.

Fluorinated polyurethane coatings are prepared in a similar manner as for polyurethane. Fluorinated polyurethane precursor (Luxecolor 4FVBA-800, obtained from Helicity Technologies, Inc.) is mixed in a ratio of fluroinated polyol solution to polyisocyanate crosslinker (Desmodur N3400) 10:0.8 by weight, together with 1 wt % DBE-224 in the final solid film. The mixture is spin coated on clean silicon substrates at 2000 rpm for 60 s. Then these samples are cured for 24 h at room temperature followed for another 24 h at 60° C. Pure fluorinated polyurethane is processed in the same condition to prepare the control samples.

While PDMS elastomer coatings incorporating PDMS-PEG copolymers show low ice adhesion, PDMS or silicone elastomers have not typically been used as coating materials applied to airplanes, wind turbines, power lines, vehicles, or construction structures due to their poor mechanical properties and abrasion resistance. To explore the broad utility and effectiveness of the current strategy, 1 wt % DBE-224 PDMS-PEG copolymer was also blended into a range of other matrix materials including epoxy resin, polyurethane, or fluoro-polyurethane, which are typically used as hard coatings, top coatings, or anti-reflection coatings in the aforementioned applications. Water contact angles and ice adhesion strengths are measured using the same experimental procedures as described previously, and the results are reported in Table 4. Blending only 1 wt % DBE-224 into each continuous matrix reduces the ice adhesion strength to about ⅓ of the ice adhesion strength observed on each type of coating. Water contact angles and ice adhesion strength are measured using the same experimental procedures as described previously, and the results are reported in Table 4. Blending only 1 wt % DBE-224 reduces the ice adhesion strength to about ⅓ of the ice adhesion strength observed on each type of coating. The 1 wt % DBE-224 doesn't appreciably change the mechanical properties of these coating. Therefore the method introduced here shall have broad applications in coating airplanes, ships, wind turbines, power lines, vehicles, buildings and solar panels for reducing ice adhesion.

TABLE 4

Measured Water Contact Angles and Average Shear Strengths of Ice Adhesion for Commercial Coatings and Commercial Coatings Containing 1 wt % PDMS-PEG Copolymers

| Surfaces | Advancing Angle ($\theta_{adv}$) | Receding Angle ($\theta_{rec}$) | Ice adhesion Strength (kPa) |
|---|---|---|---|
| Epoxy | 75 ± 1° | 44 ± 1° | 404 ± 48 |
| Epoxy + 1 wt % DBE-224 | 101 ± 1° | 73 ± 2° | 153 ± 9 |
| Polyurethane | 83 ± 1° | 46 ± 1° | 582 ± 93 |
| Polyurethane + 1 wt % DBE-224 | 83 ± 1° | 34 ± 1° | 185 ± 4 |
| Fluoro-Polyurethane | 96 ± 1° | 69 ± 1° | 686 ± 203 |
| Fluoro-Polyurethane + 1 wt % DBE-224 | 99 ± 1° | 52 ± 2° | 148 ± 48 |

Figure 5A:
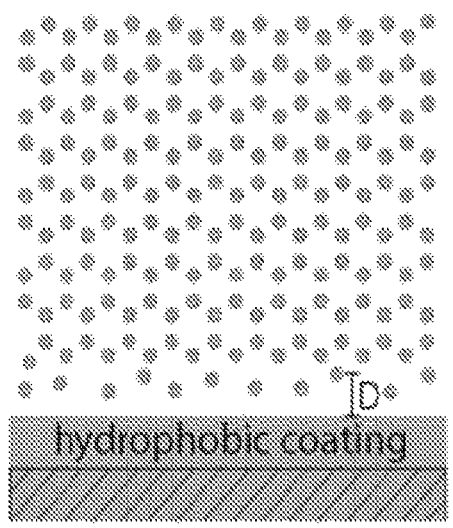
FIGS. 5A-5B show proposed mechanisms responsible for low ice adhesion on two distinct types of surfaces.

To determine the mechanisms of low ice adhesion strength on the two different types of surfaces, it is important to interrogate how water molecules interact with these two types of surfaces. For the hydrophobic surfaces, both experiments and simulations have identified the existence of a density-depleted region between the water and the hydrophobic surfaces. See, Poynor, A.; Hong, L.; Robinson, I. K.; Granick, S.; Zhang, Z.; Fenter, P. A., How Water Meets a Hydrophobic Surface. *Phys. Rev. Lett.* 2006, 97, 266101, Chattopadhyay, S.; Uysal, A.; Stripe, B.; Ha, Y.-g.; Marks, T. J.; Karapetrova, E. A.; Dutta, P., How Water Meets a Very Hydrophobic Surface. *Phys. Rev. Lett.* 2010, 105, 037803, and Janecek, J.; Netz, R. R., Interfacial Water at Hydrophobic and Hydrophilic Surfaces: Depletion Versus Adsorption. *Langmuir* 2007, 23, 8417-8429, each of which is incorporated by reference in its entirety. The thickness of the depletion layer (D, as indicated in FIG. 5A) grows as the hydrophobicity of the surface increases, represented by the increasing water contact angle. On a hydrophobic surface, the interaction between water/ice and the substrate will be dominated by van der Waal's forces. See, Menini, R.; Farzaneh, M., Advanced Icephobic Coatings. *J. Adhes. Sci. Technol.* 2011, 25, 971-992, which is incorporated by reference in its entirety. The adhesion strength is given by $$\tau_a = A/6\pi D^3 \tag{1}$$

where $A \sim 10^{-19}$ J is the Hamaker constant and D is the thickness (typically in the range of 0.1-1 nm) of the depletion layer. As surface hydrophobicity increases, D increases and $\tau_a$ decreases. This molecular picture agrees qualitatively with the empirical relationship ($\tau_{max} = K(1+\cos\theta_{rec})$) proposed by Meuler et al based on direct measurements of ice adhesion strength on different surfaces. The Fluoro-POSS/PEMA surface is the surface known to have the highest intrinsic hydrophobicity as measured by a value of the receding contact angle of water $\theta_{rec} = 117\pm1°$. Therefore, the depletion layer thickness between water and such a surface will be the largest (on the order of 1 nm), which gives rise to the lowest ice adhesion values on smooth, hydrophobic solid surfaces. The estimated adhesion strength from equation (1) gives $\tau_a = 1$ MPa, which is much higher than the measured ice adhesion strength. This is because equation (1) does not take into account the defect size at the interface in the experiments, which can significantly lower the interfacial fracture strength.

Figure 5B:
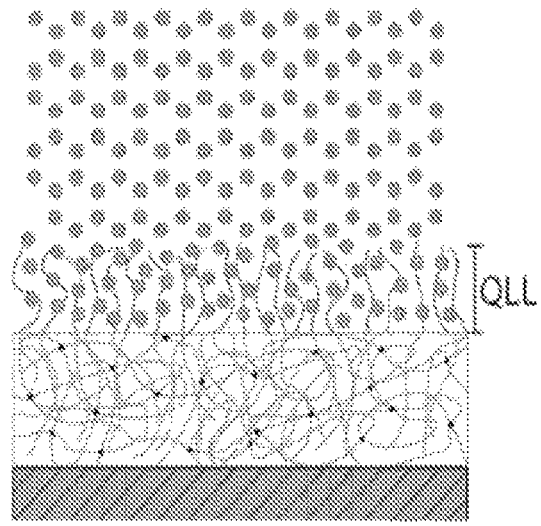

For the PDMS+PDMS-PEG surfaces, 1 wt % PDMS-PEG copolymer is blended into silicone elastomer precursor (Sylgard 184 PDMS 10:1 by weight mixing ratio) prior to spin coating on a silicon wafer substrate and subsequent curing to form an elastomer film. In air, PDMS components saturate at the surface of the elastomer film to lower the surface energy. However, when in contact with water, the extremely low glass transition temperature of PDMS ($T_g \approx -125°$ C.) allows for the rearrangement of the surface molecules. See, Synytska, A.; Biehlig, E.; Ionov, L., Adaptive PEG-PDMS Brushes: Effect of Architecture on Adhesiveness in Air and under Water. *Macromolecules* 2014, 47, 8377-8385, and Zhang, L.; Zhang, Z.; Wang, P., Smart Surfaces with Switchable Superoleophilicity and Superoleophobicity in Aqueous Media: toward Controllable Oil/Water Separation. *NPG Asia Mater.* 2012, 4 (2), e8, each of which is incorporated by reference in its entirety. PEG chains will preferentially segregate to the interface to interact with water molecules and lower the interfacial energy of the total system. See, Synytska, A.; Biehlig, E.; Ionov, L., Adaptive PEG-PDMS Brushes: Effect of Architecture on Adhesiveness in Air and under Water. *Macromolecules* 2014, 47, 8377-8385, which is incorporated by reference in its entirety. PEG molecules are known to bind strongly with water molecules through hydrogen bonding. See, Israelachvili, J., The Different Faces of Poly (Ethylene Glycol). *Proc. Natl. Acad. Sci. U.S.A.* 1997, 94, 8378-8379, and Lee, H.; Alcaraz, M. L.; Rubner, M. F.; Cohen, R. E., Zwitter-Wettability and Antifogging Coatings with Frost-Resisting Capabilities. *ACS Nano* 2013, 7, 2172-2185, each of which is incorporated by reference in its entirety. As shown in FIG. 5B, the hydrogen bonded water molecules can form a thin hydration layer (or "quasi-liquid like" (QLL) layer) at the interface, which serves as a self-lubricating layer to reduce the ice adhesion on the coated substrates.

Strong hydrogen-bonding interactions between water molecules and PEG chains suppress the formation and growth of ice crystals within the hydration layer. The free energy of water freezing point depression is given by the Gibbs-Helmholtz equation $$\Delta G_f = \Delta H_f (1-T/T_f), \tag{2}$$

where $\Delta G_f$ is the Gibbs free energy, $\Delta H_f = 6.02$ kJ/mol is the molar fusion energy of ice melting, $T_f = 273$ K and T is the suppressed freezing point. See, Atkins, P., Physical Chemistry. 6th. Oxford University Press: 1998, which is incorporated by reference in its entirety. The freezing of water in the hydration layer is penalized by the favorable energy of mixing between PEG chains and water molecules. PEG chains strongly hydrogen bond with water molecules. The energy of mixing for this strongly associating system cannot be estimated by the classical Flory-Huggins theory. One of the limitations of the classic Flory-Huggins theory is that it assumes there are no energetically preferred arrangements of polymer segments and solvent molecules in the solution. For the PEG-water system, strong hydrogen bonding interaction significantly reduces the configurational entropy of bonded water molecules. Therefore extended Flory-Huggins models have been formulated. See, Huang, L.; Nishinari, K., Interaction between Poly (Ethylene Glycol) and Water as Studied by Differential Scanning calorimetry. *J. Polym. Sci. Part B Polym. Phys.* 2001, 39, 496-506, and Dormidontova, E. E., Role of Competitive PEO-Water and Water-Water Hydrogen Bonding in Aqueous Solution PEO Behavior. *Macromolecules* 2002, 35, 987-1001, each of which is incorporated by reference in its entirety. One simple approach is to consider an effective Flory-Huggins parameter $\chi_{eff} = \chi_{eff}(T,\phi)$ that depends on the temperature and the polymer volume fraction, so the free energy of mixing can still be calculated following the classical Flory-Huggins model $$\frac{\Delta G_{mix}}{RT} = (1-\phi)\ln(1-\phi) + \frac{\phi v}{Nv_p}\ln\phi + \chi_{eff}\phi(1-\phi), \tag{3}$$

where $\Delta G_{mix}$ is the free energy of mixing, R is the ideal gas constant, T is the temperature, $\phi$ is the polymer volume fraction in the hydration layer, N is the degree of polymerization, v and $v_p$ are the molar volume of water and the polymer repeating units, respectively. Balancing the freezing point depression energy with the energy of demixing $$\Delta G_f + \Delta G_{mix} = 0, \tag{4}$$

and assuming that $\phi = 0.4$, $Nv_p/v = 20$, and $\chi_{eff} = 0.3$ (according to the experimental conditions and literature values for water-PEG system; see, Feng, W.; Nieh, M.-P.; Zhu, S.; Harroun, T. A.; Katsaras, J.; Brash, J. L., Characterization of Protein Resistant, Grafted Methacrylate Polymer Layers Bearing Oligo (Ethylene Glycol) and Phosphorylcholine Side Chains by Neutron Reflectometry. *Biointerphases* 2007, 2, 34-43, Dormidontova, E. E., Role of Competitive PEO-Water and Water-Water Hydrogen Bonding in Aqueous Solution PEO Behavior. *Macromolecules* 2002, 35, 987-1001, and Bae, Y.; Shim, J.; Soane, D.; Prausnitz, J., Representation of Vapor-Liquid and Liquid-Liquid Equilibria for Binary Systems Containing Polymers: Applicability of an Extended Flory-Huggins Equation. *J. Appl. Polym. Sci.* 1993, 47, 1193-1206, each of which is incorporated by reference in its entirety), it is estimated that a water freezing point depression is $T_f - T = 23$ K. Considering the similarity between surface grafted polymer chains in a good solvent and rearranged PEG component in the hydration layer of the sample, the averaged polymer volume fraction in the hydration layer is assumed to be similar to that ($\phi \approx 0.4$) of surface grafted polymer chains in a good solvent. This estimate of a 23 K freezing point depression is based on the assumption of a constant polymer volume fraction in the hydration layer. In actuality, the real hydration layer comprises of multiple layers. See, Israelachvili, J., The Different Faces of Poly (Ethylene Glycol). *Proc. Natl. Acad. Sci. U.S.A.* 1997, 94, 8378-8379, and Dormidontova, E. E., Role of Competitive PEO-Water and Water-Water Hydrogen Bonding in Aqueous Solution PEO Behavior. *Macromolecules* 2002, 35, 987-1001, each of which is incorporated by reference in its entirety. Water molecules in the loosely bounded outer layer freeze first. So the polymer volume fraction in the hydration layer increases as the temperature is lowered during the freezing process. As shown below, this gradual freezing process of the hydration layer can be observed from the relative $^1$H peak intensity measured in the nuclear magnetic resonance (NMR) experiments.

Figures 6A, 6B:
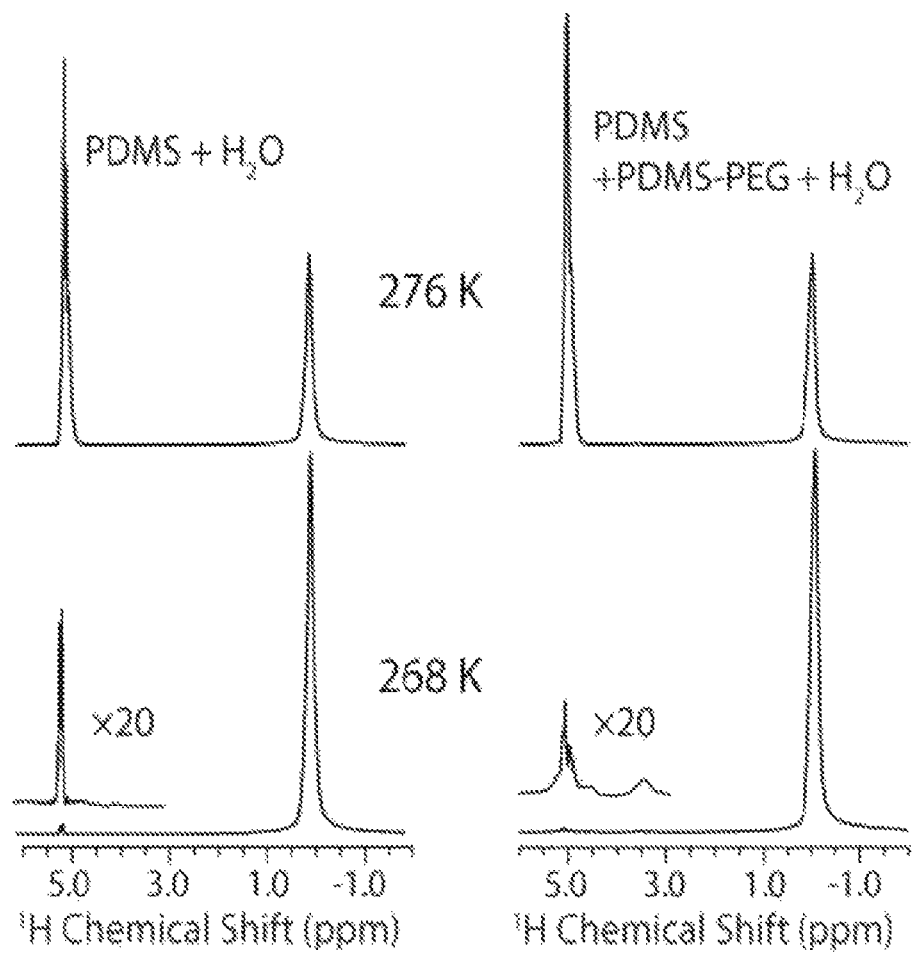
FIGS. 6A-6B show $^1$H spectra of PDMS+water (FIG. 6A) and PDMS+PDMS-PEG+water (FIG. 6B) samples. The water and PDMS peaks are observed at 5 and 0 ppm, respectively. Approximately 99% of the liquid water was frozen into ice after holding the sample at 268 K for three hours.

Solid-state NMR spectroscopy was used to confirm the existence of the non-frozen quasi-liquid-layer (QLL) at the interface between the bulk water and the PDMS+PDMS-PEG coating. NMR is an ideal candidate for identifying trace amounts of non-frozen water because solid ice is invisible to conventional $^1$H NMR experiments due to its extremely long $T_1$ and short $T_2$ relaxation times, while liquid water produces an easily detectable $^1$H signal. See, Kuntz, I. D.; Brassfield, T. S.; Law, G. D.; Purcell, G. V., Hydration of Macromolecules. *Science* 1969, 163, 1329-1331, and Kvlividze, V.; Kiselev, V.; Kurzaev, A.; Ushakova, L., The Mobile Water Phase on Ice Surfaces. *Surf. Sci.* 1974, 44, 60-68, each of which is incorporated by reference in its entirety. $^1$H spectra were first measured for the PDMS+water and PDMS+PDMS-PEG+water samples at 276 K to characterize bulk water properties before the start of the freezing process. Both samples show water $^1$H chemical shifts of 5.03 ppm, with a linewidth of 0.4 ppm and with similar lineshapes. After decreasing the temperature to 268 K and stabilizing for three hours, the water $^1$H signal intensity of both samples decreased to only ~1% of the intensities at 276 K (FIGS. 6A-6B).

Beginning at 268 K in the temperature decremented experiments, sharp features with linewidths of 5 Hz are observed in the water peak that were not present in the 276 K spectra (FIGS. 7A-7B). These features are attributed to water trapped in microenvironments at the polymer-water interface with different hydrogen-bonding networks that are unable to exchange with other microenvironments. In contrast, the 276 K spectra show a broad peak composed of overlapping peaks with linewidths of 10-30 Hz, indicating fast exchange of all water above the bulk water freezing point. Solid-state NMR studies of the interaction of water with proteins, phospholipid membranes, and plant cell wall polysaccharides have been previously reported. See, Li, S.; Su, Y.; Luo, W.; Hong, M., Water-Protein Interactions of an Arginine-Rich Membrane Peptide in Lipid Bilayers Investigated by Solid-State Nuclear Magnetic Resonance Spectroscopy. *J. Phys. Chem. B* 2010, 114, 4063-4069, Luo, W.; Hong, M., Conformational Changes of an Ion Channel Detected through Water-Protein Interactions Using Solid-State NMR Spectroscopy. *J. Am. Chem. Soc.* 2010, 132, 2378-2384, White, P. B.; Wang, T.; Park, Y. B.; Cosgrove, D. J.; Hong, M., Water-Polysaccharide Interactions in the Primary Cell Wall of *Arabidopsis Thaliana* from Polarization Transfer Solid-State NMR. *J. Am. Chem. Soc.* 2014, 136, 10399-10409, and Williams, J. K.; Hong, M., Probing Membrane Protein Structure Using Water Polarization Transfer Solid-State NMR. *J. Magn. Reson.* 2014, 247, 118-127, each of which is incorporated by reference in its entirety. Most of these experiments relied on magnetization transfer from water protons to protons in the biomolecules and then to $^{13}$C enriched nuclei. However, these techniques are not applicable to the unlabeled polymers studied here due to the low natural abundance of $^{13}$C. In these previous studies of proteins and polysaccharides, when the sample temperature was lowered below the bulk water freezing point, no qualitative differences in the water lineshapes was observed, in contrast to the water observed in the current polymeric samples. Linewidths narrower than 10 Hz were not observed in any of the previous studies and usually only up to two water peaks were observed, indicating that there are no distinct microenvironments free of exchange on the relevant NMR time scales.

The water $^1$H chemical shifts of the PDMS polymers increase with decreasing temperature. This trend is consistent with previous studies of supercooled water (see Angell, C. A.; Shuppert, J.; Tucker, J. C., Anomalous Properties of Supercooled Water. Heat Capacity, Expansivity, and Proton Magnetic Resonance Chemical Shift from 0 to −38%. *J. Phys. Chem.* 1973, 77, 3092-3099, which is incorporated by reference in its entirety), and can be attributed to stronger hydrogen bonding at lower temperatures, deshielding the water protons. Angell et al. observed an average $^1$H chemical shift change of −0.01 ppm/K in the range from 273 to 263 K, which is identical to the observed chemical shift changes for the dominant water peaks in the two samples between 268 and 253 K. Below 263 K, the $^1$H chemical shift change with temperature became more nonlinear, with a negative slope increasing in magnitude. The most intense water peaks were used for the PDMS+water and the PDMS+PDMS-PEG+water samples, labelled A and B (FIGS. 7A-7B), for comparing the $T_2$ relaxation data. Assignment of these two peaks throughout the temperature range can be slightly ambiguous due to the clustering of multiple sharp peaks. However, neighboring peaks have similar $^1$H $T_2$ relaxation times within experimental uncertainty. Thus, assignment ambiguity does not affect the conclusions drawn from the relaxation data.

There are two sets of peaks in the PDMS+PDMS-PEG+water spectra (FIG. 7B) that are distinctly absent from the PDMS+water spectra (FIG. 7A). The first is the PEG hydroxyl peak at 4.5 ppm. See, Dust, J. M.; Fang, Z. H.; Harris, J. M., Proton NMR Characterization of Poly(Ethylene Glycols) and Derivatives. *Macromolecules* 1990, 23, 3742-3746, which is incorporated by reference in its entirety. This peak does not become visible until the spectrum is magnified 500 fold because PEG only makes up 0.25% of the total mass of the polymer in this sample. The second set of peaks that are present in the PDMS+PDMS-PEG+water spectra but not the PDMS+water spectra are the peaks ~0.2 ppm upfield of the main water peaks. The dominant peak in this set is labeled as peak C (FIG. 7B), and measured its $T_2$ relaxation time. These upfield peaks are attributed to water protons that exchange with the PEG hydroxyl protons on timescales faster than the $^1$H chemical shift differences between water and PEG, which is approximately 120 s$^{-1}$. The lower temperature sensitivity of the peak C $^1$H chemical shift compared to peaks A and B is consistent with previous observations that strong hydrogen bonds have a smaller temperature sensitivity to chemical shift. See, Baxter, N. J.; Williamson, M. P., Temperature Dependence of 1H Chemical Shifts in Proteins. *J. Biomol. NMR* 1997, 9, 359-369, which is incorporated by reference in its entirety. This observation confirms the existence of non-frozen water even at −20° C., which serves as a self-lubricating interfacial layer, and is responsible for the low ice adhesion strength on the PDMS-PEG surfaces. As the temperature is lowered below 263 K, the signal intensity of the non-frozen water (indicating the amount of non-frozen water) quickly decreases. At a critical degree of subcooling, the non-frozen water will significantly decrease and may completely freeze eventually, which is responsible for the sudden steep increase in the ice adhesion strength observed on such types of self-lubricating surfaces. See, Chen, J.; Dou, R.; Cui, D.; Zhang, Q.; Zhang, Y.; Xu, F.; Zhou, X.; Wang, J.; Song, Y.; Jiang, L., Robust Prototypical Anti-Icing Coatings with a Self-Lubricating Liquid Water Layer between Ice and Substrate. *ACS Appl. Mater. Interfaces* 2013, 5, 4026-4030, which is incorporated by reference in its entirety.

Figure 8A:
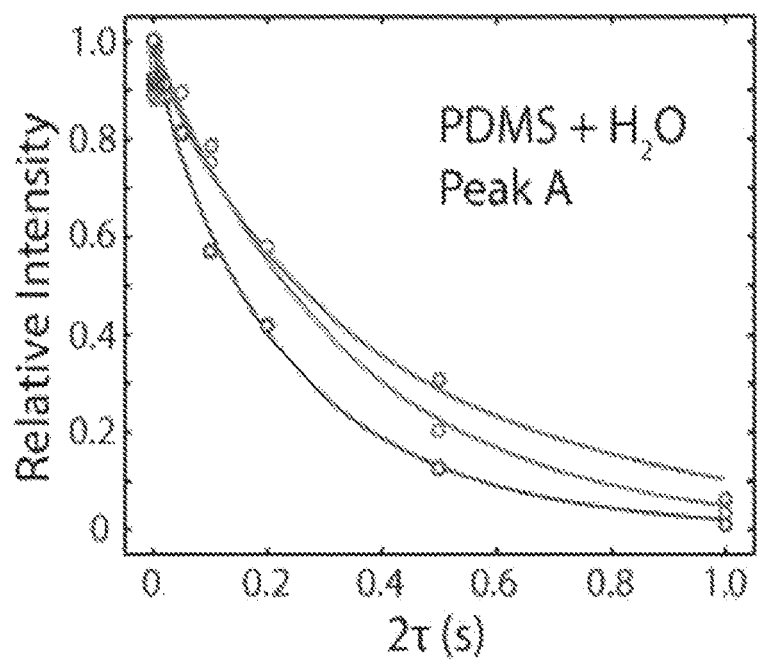
FIGS. 8A-8C shows $T_2$ relaxation decay curves corresponding to the peaks labeled A, B, and C from FIG. 7. Stretched exponential fits are plotted for the three temperatures shown: 268 K, 263 K, and 258 K. Peak C has the strongest dependence on temperature, as can be seen by the much faster signal decay at 258 K compared to 263 K or 268 K.
Figure 8B:
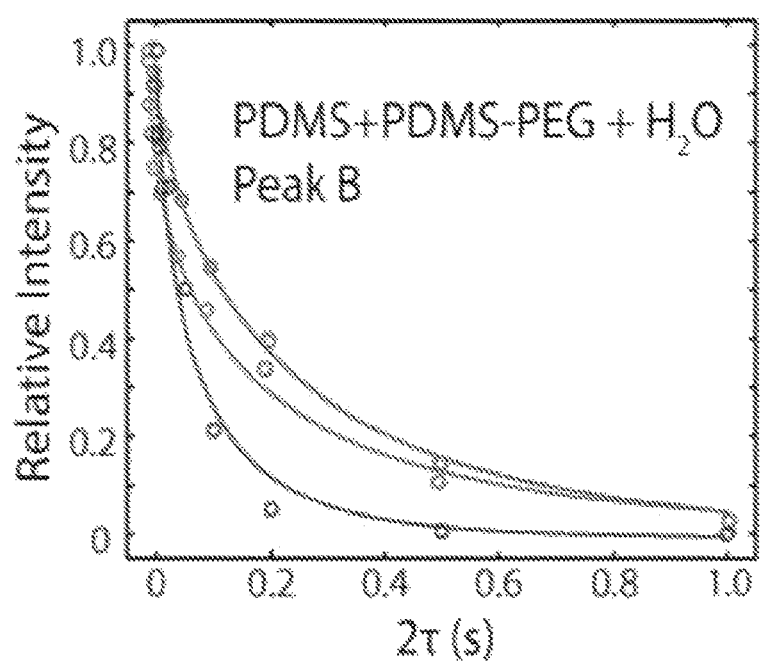
Figure 8C:
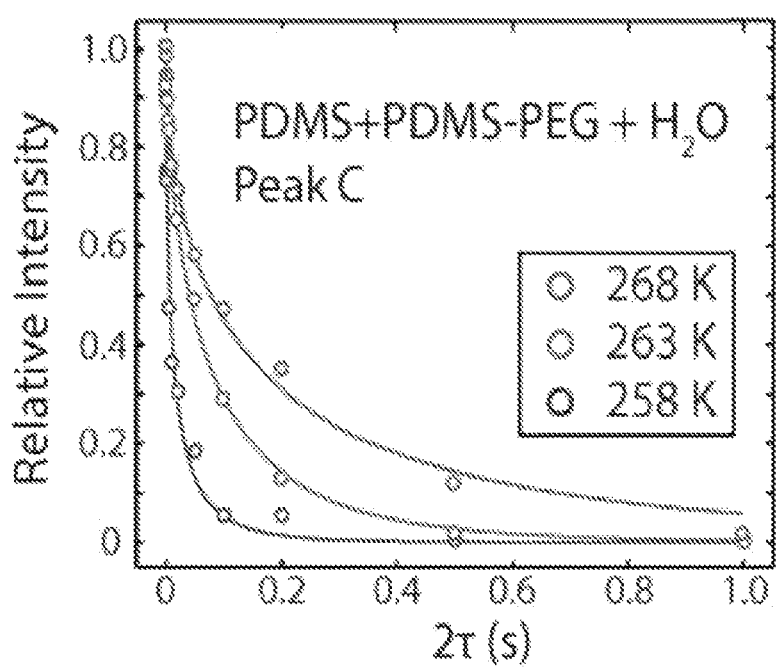

The freezing point depression arises primarily from the colligative behavior of PEG chains in water. The unique hydrogen-bonding associations between PEG and water molecules lead to highly ordered water molecules in the hydration layer. See, Israelachvili, J., The Different Faces of Poly (Ethylene Glycol). *Proc. Natl. Acad. Sci. U.S.A.* 1997, 94, 8378-8379, which is incorporated by reference in its entirety. The structured water molecules in the quasi-liquid layer have a much lower configurational entropy compared to bulk water (see Jung, S.; Dorrestijn, M.; Raps, D.; Das, A.; Megaridis, C. M.; Poulikakos, D., Are Superhydrophobic Surfaces Best for Icephobicity? *Langmuir* 2011, 27, 3059-3066, which is incorporated by reference in its entirety), which leads to a tremendous increase in the water viscosity. Experimentally, it has been observed that the local viscosity of water hydrogen bonded with PEG is six orders of magnitude larger than that of bulk water. See, Kim, H. I.; Kushmerick, J. G.; Houston, J. E.; Bunker, B. C., Viscous "Interphase" Water Adjacent to Oligo (Ethylene Glycol)-Terminated Monolayers. *Langmuir* 2003, 19, 9271-9275, which is incorporated by reference in its entirety. In the current system, the viscosity of non-frozen water is estimated by performing $^1$H $T_2$ relaxation measurements. The $T_2$ relaxation decays, shown in FIGS. 8A-8C, cannot be fit to a single-exponential or a biexponential function for all the peaks across the temperature range of 268 K to 253 K. This multiexponential character is attributed to complex interactions of water trapped in microenvironments during the freezing process as well as chemical exchange of water with PEG. To allow uniform fitting of all the peaks at all measured temperatures, a stretched exponential function is used, $$\frac{S}{S_0} = e^{-(t/T_2)^\beta}, \quad (5)$$

which allows us to use a single time constant to characterize each decay curve. The exponential $\beta$ denotes the extent of $T_2$ distribution: $\beta=1$ indicates a single-exponential fit, while smaller $\beta$ values reflect broader distributions of time constants (See Table 5 for tabulated values of $T_2$ and $\beta$).

$^1$H $T_2$ relaxation times can be related to molecular motions and viscosity using theories developed by Bloembergen et al. and Debye. See, Bloembergen, N.; Purcell, E. M.; Pound, R. V., Relaxation Effects in Nuclear Magnetic Resonance Absorption. *Phy. Rev.* 1948, 73, 679-712, and Debye, P. J. W., *Polar Molecules*. New York: The Chemical Catalog Company, Inc, 1929, each of which is incorporated by reference in its entirety. In this Bloembergen-Purcell-Pound (BPP) theory, $T_2$ relaxation times are related to rotational correlation times according to:

$$T_2^{-1} = \frac{3\gamma^4\hbar^2}{20r^6}\left(3\tau_c + \frac{5\tau_c}{1+\omega_0^2\tau_c^2} + \frac{2\tau_c}{1+4\omega_0^2\tau_c^2}\right) \quad (6)$$

where $\gamma$ is the $^1$H gyromagnetic ratio, h is the reduced Planck constant, r is the internuclear distance between interacting dipoles, $\tau_c$ is the rotational correlation time, and $\omega_0$ is the $^1$H Larmor frequency at the given magnetic field strength. At a 400 MHz Larmor frequency, due to the correlation times of 10-100 ps for water below its freezing point, the second and third terms in the above equation can be neglected, leaving the following proportionality:

$$T_2^{-1} \propto \tau_c \quad (7)$$

Using a modified version of the correlation time in Debye's theory of dielectric dispersion in polar liquids, the rotational correlation time can be related to viscosity by the expression:

$$\tau_c = \frac{4\pi\eta r^3}{3k_B T} \quad (8)$$

where $\eta$ is the liquid viscosity, $k_B$ is the Boltzmann constant, and T is absolute temperature.

Equations (7) and (8) indicate that $^1$H $T_2$ relaxation times are proportional to temperature and inversely proportional to viscosity. As expected, the measured water $^1$H $T_2$ times decreased monotonically for all three peaks with decreasing temperature, indicating a slowing down of molecular motions and increased rotational correlation times. Water populations existing at the same temperature but with different $T_2$ relaxation times have different viscosities. $\tau_c$ and $\eta$ are calculated using Eq. 6 and Eq. 8, assuming that the $^1$H-$^1$H internuclear distance in liquid water is 1.5 Å (Table 6). At 268 K, the calculated viscosity associated with Peak C, 0.034 Pa·s, is twice that of Peak A, 0.013 Pa·s, and about 1.5 times that of Peak B, 0.024 Pa·s. Moreover, the water viscosity associated with Peak C is more sensitive to temperature changes than the peaks associated with other local

TABLE 5

Chemical Shift and Relaxation Data for Peaks A, B and C.

| | Peak A | | | Peak B | | | Peak C | | |
| --- | --- | --- | --- | --- | --- | --- | --- | --- | --- |
| T (K) | $^1$H CS (ppm) | $^1$H $T_2$ (ms) | $\beta$ | $^1$H CS (ppm) | $^1$H $T_2$ (ms) | $\beta$ | $^1$H CS (ppm) | $^1$H $T_2$ (ms) | $\beta$ |
| 276 K | 5.03 | 566 ± 13 | 1.15 ± 0.04 | 5.03 | 354 ± 8 | 1.06 ± 0.03 | N/A | N/A | N/A |
| 268 K | 5.04 | 389 ± 61 | 0.85 ± 0.12 | 5.10 | 216 ± 15 | 0.68 ± 0.04 | 5.01 | 150 ± 15 | 0.55 ± 0.04 |
| 263 K | 5.08 | 337 ± 40 | 0.99 ± 0.13 | 5.15 | 207 ± 11 | 0.70 ± 0.03 | 5.12 | 73 ± 4 | 0.66 ± 0.03 |
| 258 K | 5.14 | 225 ± 20 | 0.87 ± 0.08 | 5.22 | 65 ± 12 | 0.65 ± 0.09 | 5.07 | 13 ± 2 | 0.53 ± 0.07 |
| 253 K | 5.25 | 122 ± 5 | 1.02 ± 0.05 | 5.27 | 50 ± 5 | 0.79 ± 0.07 | N/A | N/A | N/A | water microenvironments: at 258 K, the water viscosity associated with Peak C is 0.64 Pa·s, which is more than an order of magnitude larger than that of Peaks A or B, 0.022 and 0.077 Pa·s, respectively, at the same temperature.

TABLE 6

Calculated Rotational Correlation Times and Viscosities for Peaks A, B, and C.

| | Peak A | | Peak B | | Peak C | |
|---|---|---|---|---|---|---|
| T (K) | $\tau_c$ ($10^{-11}$ s) | $\eta$ (Pa·s) | $\tau_c$ ($10^{-11}$ s) | $\eta$ (Pa·s) | $\tau_c$ ($10^{-11}$ s) | $\eta$ (Pa·s) |
| 276 K | 3.47 | 0.0094 | 5.54 | 0.015 | N/A | N/A |
| 268 K | 5.04 | 0.013 | 9.09 | 0.024 | 13.1 | 0.034 |
| 263 K | 5.82 | 0.015 | 9.49 | 0.024 | 27.3 | 0.070 |
| 258 K | 8.73 | 0.022 | 30.8 | 0.077 | 254 | 0.64 |
| 253 K | 16.2 | 0.040 | 40.3 | 0.10 | N/A | N/A |

Figure 9:
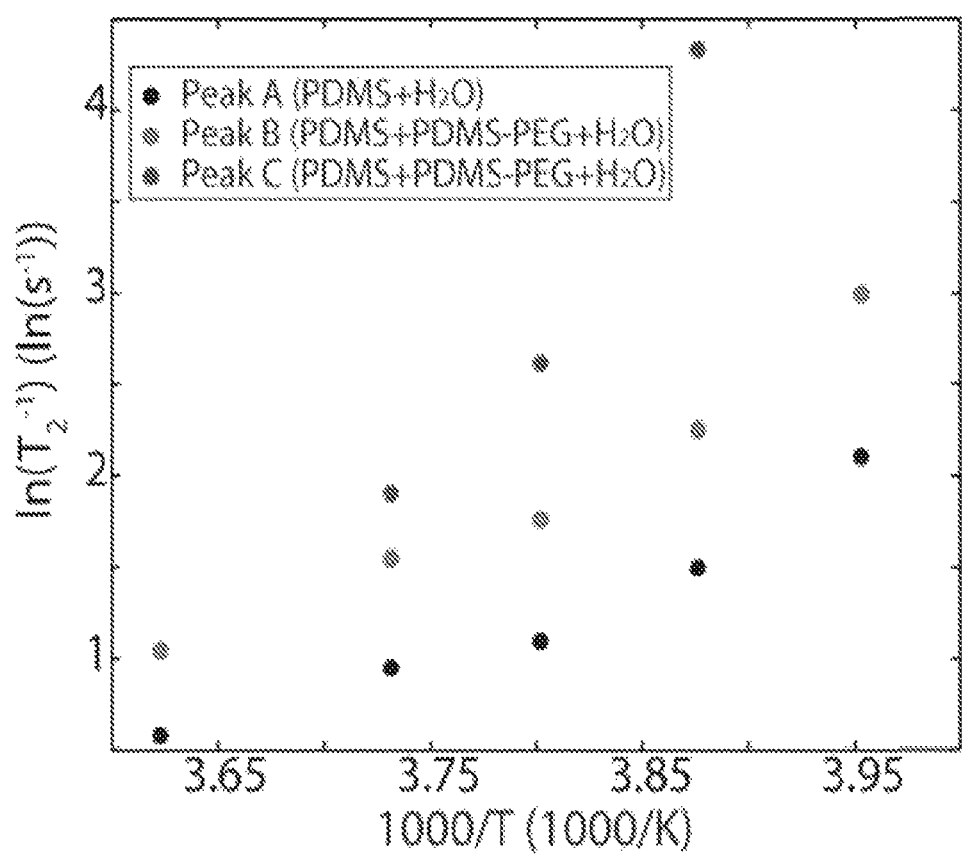
FIG. 9 shows natural log of $T_2^{-1}$ versus inverse temperature plot for Peaks A, B, and C. The steeper slope for Peak C indicates a higher activation energy for molecular motion compared to peaks A or B.

Supercooled water has previously been observed to be a fragile liquid that exhibits non-Arrhenius behavior. A thermodynamic analysis of this behavior is provided by Ito et al. See, Ito, K.; Moynihan, C. T.; Angell, C. A., Thermodynamic Determination of Fragility in Liquids and a Fragile-to-Strong Liquid Transition in Water. *Nature* 1999, 398, 492-495, which is incorporated by reference in its entirety. In the PDMS+PDMS-PEG system, plotting $\ln(T_2^{-1})$ versus 1000/T (FIG. 9) shows non-Arrhenius behavior and does not fit the simple model:

$$\tau_c = \tau_{c,0} e^{\frac{-E_a}{R}\left(\frac{1}{T}-\frac{1}{T_0}\right)} \quad (9)$$

where $\tau_{c,0}$ is the rotational correlation time at a reference temperature $T_0$, $E_a$ is the activation energy of molecular rotational motion, and R is the ideal gas constant. However, useful information can still be extracted from this plot, even if an explicit expression for the activation energy cannot. Peaks A and B have a similar temperature dependence of $\ln(T_2^{-1})$, suggesting that the energy barrier for motion in these water populations is similar. The most striking feature of this plot is the larger slope observed for peak C compared to peaks A and B. This strong temperature dependence of $\ln(T_2^{-1})$ indicates a higher barrier to motion for water molecules described by peak C. This large motional barrier is attributed to a highly viscous quasi-liquid layer of water that is strongly hydrogen-bonded to PEG at the interface between ice and polymer. Although it is difficult to comment on the nonlinearity with only three data points, Peak C appears to have a much more significant non-Arrhenius behavior than peaks A or B, further suggesting that this population of water is in a viscous environment with a stronger hydrogen bonding network than observed for peaks A or B. It has previously been demonstrated that the ice nucleation rate is inversely proportional to the viscosity of water (J∝1/η). See, Li, K.; Xu, S.; Chen, J.; Zhang, Q.; Zhang, Y.; Cui, D.; Zhou, X.; Wang, J.; Song, Y., Viscosity of Interfacial Water Regulates Ice Nucleation. *Appl. Phys. Lett.* 2014, 104, 101605, which is incorporated by reference in its entirety. The much higher local viscosity associated with Peak C will significantly lower the freezing rate at the water/PEG-functionalized interface.

The water interaction with the PDMS-PEG polymer is distinct from the water interaction with antifreeze proteins. Siemer et al. used relaxation and 2D correlation solid-state NMR experiments to investigate the water structuring mechanism of antifreeze proteins. See, Siemer, A. B.; Huang, K.-Y.; McDermott, A. E., Protein-Ice Interaction of an Antifreeze Protein Observed with Solid-State NMR. *Proc. Natl. Acad. Sci. U.S.A.* 2010, 107, 17580-17585, which is incorporated by reference in its entirety. Utilizing $^{13}$C indirect detection of $^1$H $T_1$ relaxation times, $^1$H cross saturation experiments, and 2D $^{13}$C-$^1$H correlation experiments, they showed that the antifreeze protein (AFP III) directly interacts with both ice and water, while the control protein, ubiquitin, is surrounded by a liquid hydration shell and is thus shielded from ice. Thus, AFP III binds to small ice crystals to retard nucleation and hence inhibit bulk ice formation and deposition. This mechanistic interaction differs from the mechanism of the icephobic PDMS-PEG polymers found here. Instead of retarding bulk-ice formation, the PDMS-PEG coating maintains a quasi-liquid water layer between the ice and polymer so that any bulk ice that forms does not strongly adhere to the polymer surface and can be easily removed by shear.

Figure 10A:
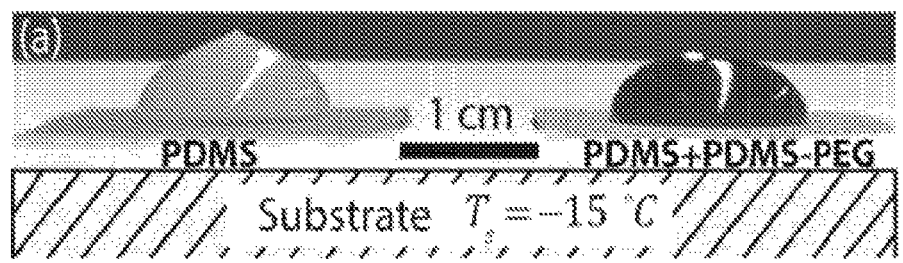
FIG. 10A-10B show delayed ice nucleation on the PDMS+PDMS-PEG surface in large water droplets in contact with a cold substrate ($T_s$=−15° C.) (FIG. 10A) and in micro-water droplets by differential scanning calorimetry (DSC) (FIG. 10B).
Figure 10B:
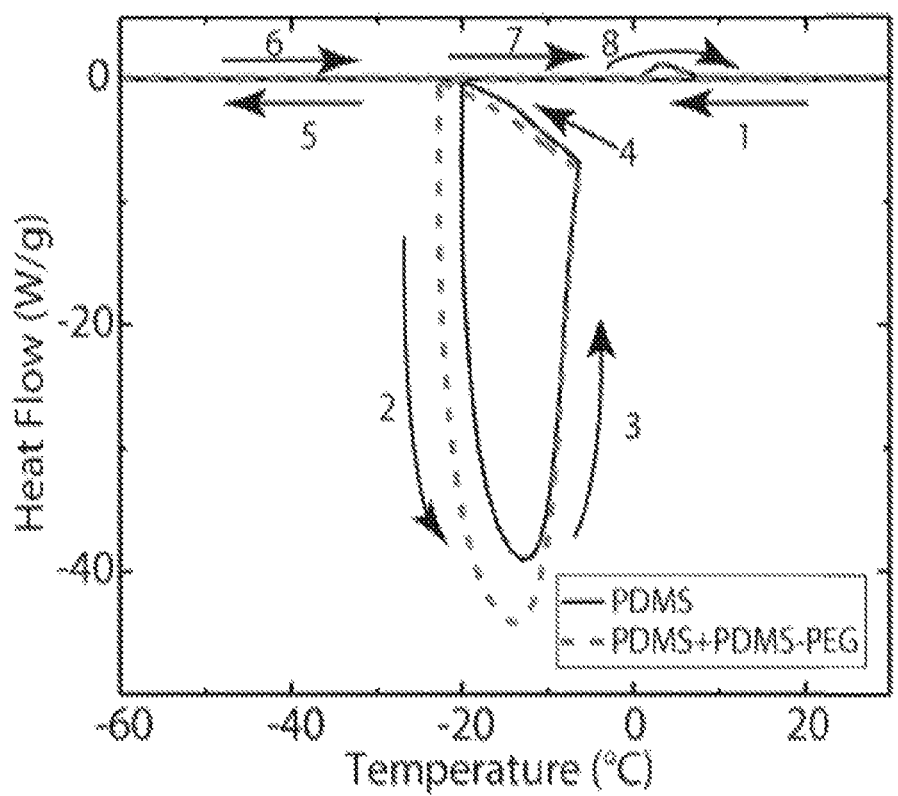

In addition to low ice adhesion strength, delayed ice nucleation can be another criterion for determining the icephobicity of a surface. See, Sojoudi, H.; Wang, M.; Boscher, N.; McKinley, G.; Gleason, K., Durable and Scalable Icephobic Surfaces: Similarities and Distinctions from Superhydrophobic Surfaces. *Soft Matter* 2016, 12, 1938-1963, which is incorporated by reference in its entirety. Ice nucleation is delayed on the PDMS-PEG functionalized surface in comparison to that on the PDMS functionalized surface. As shown in FIG. 10A, when a water drop in contact with a coated silicon substrate is cooled down to −15° C., heterogeneous ice nucleation starts at the liquid-solid interface and the crystallization front propagates into the water drop as heat is transferred from the water droplet to the substrate. The unfrozen part of the drop remains a spherical cap as dictated by the liquid-vapor surface tension. The drop expands in the vertical direction as the ice forms due to volumetric expansion, which, in combination with the influence of surface tension, leads to a freezing singularity at the tip. See, Marin, A. G.; Enriquez, O. R.; Brunet, P.; Colinet, P.; Snoeijer, J. H., Universality of Tip Singularity Formation in Freezing Water Drops. *Phys. Rev. Lett.* 2014, 113, 054301, which is incorporated by reference in its entirety. There have been debates about whether ice nucleation initiates at the solid-liquid-vapor three-phase contact line or at the solid-liquid interface. See, Jung, S.; Dorrestijn, M.; Raps, D.; Das, A.; Megaridis, C. M.; Poulikakos, D., Are Superhydrophobic Surfaces Best for Icephobicity? *Langmuir* 2011, 27, 3059-3066, Gurganus, C.; Kostinski, A. B.; Shaw, R. A., High-Speed Imaging of Freezing Drops: Still No Preference for the Contact Line. *J. Phys. Chem. C* 2013, 117, 6195-6200, and Fu, Q. T.; Liu, E. J.; Wilson, P.; Chen, Z., Ice Nucleation Behaviour on Sol-Gel Coatings with Different Surface Energy and Roughness. *Phys. Chem. Chem. Phys.* 2015, 17, 21492-21500, each of which is incorporated by reference in its entirety. In the experiment, a change in turbidity is first observed at the three-phase contact line during freezing, which may indicate ice nucleation at the contact line. Incorporation of 1 wt % PDMS-PEG copolymer in the PDMS coating does not change this behavior. To examine the exact location of ice nucleation, more careful experiments using a suitably positioned high-speed camera are required. Ice nucleation from a bulk water drop (with volume of 300 μL) is delayed for 2-3 min on the PDMS surface that contains 1 wt % PDMS-PEG copolymer in comparison to that on the PDMS functionalized surface. Such delayed ice nucleation in water microdrops can also be observed and quantified using differential scanning calorimetry (DSC) measurements and the results are shown in FIG. 10B. The numbered arrows indicate the cooling and subsequent heating runs at a scanning rate of 3 K/min. On the PDMS surface, as the sample is cooled below 0° C., the water is supercooled until ice formation at −19.9° C. which releases a large amount of latent heat of freezing and causes rising of the sample temperature. Then the sample is cooled again by the DSC instrument to −60° C. In the subsequent heating run, the formed ice melts at 0° C. On the PDMS surface that contains 1 wt % PDMS-PEG copolymer, the ice formation is delayed to −23.0° C., whereas the ice melts at almost the same temperature (0° C.). Delayed ice nucleation provides an additional benefit in developing icephobic coatings if supercooled water can be shed from the surface prior to freezing.

Figures 12A, 12B:
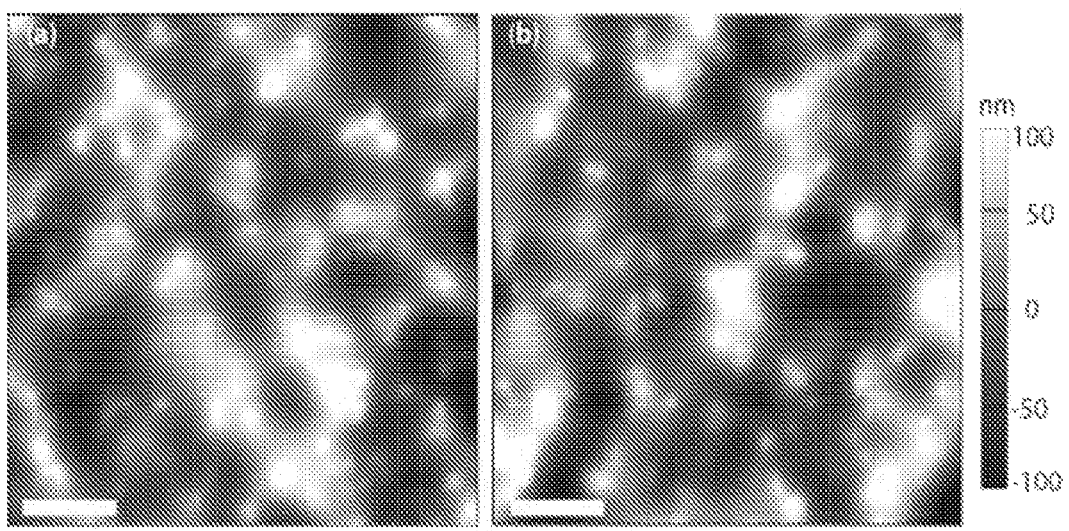
FIGS. 12A-12B show surface topography of a PDMS (Sylgard 184 10:1 base:crosslinker by weight) elastomer film containing 1 wt % PDMS-PEG copolymer (DBE-224) by atomic force microscopy (AFM).

Considering that only 1 wt % of PDMS-PEG (with the PEG component being 25 wt % within this copolymer) is embedded in the PDMS elastomer film, it is quite remarkable that such a small amount of PEG (0.25 wt % of the total sample mass) provides such a significant delay in the ice nucleation on the surface. Several factors can contribute to this delay in the nucleation kinetics. First, the increased surface roughness can play a role. See, Eberle, P.; Tiwari, M. K.; Maitra, T.; Poulikakos, D., Rational Nanostructuring of Surfaces for Extraordinary Icephobicity. *Nanoscale* 2014, 6, 4874-4881, which is incorporated by reference in its entirety. Compared to the PDMS elastomer that has a root-mean-square roughness of $R_q \approx 4$ nm, AFM measurements show that blending 1 wt % PDMS-PEG copolymer into the PDMS elastomer increases the dry surface roughness to $R_q \approx 40$ nm (FIG. 12A). When in contact with water, the mobile chains at the PDMS+PDMS-PEG surface can also rearrange their molecular configuration. However, a tapping mode AFM in water experiment found that the surface roughness of the wet sample remains the same as the dry surface roughness ($R_q \approx 40$ nm in FIG. 12B). Classic nucleation theory shows that at a given temperature, an ice nucleus must reach a critical size $r_c = 2\gamma_{iw}/\Delta G_v$, for freezing to start, where $\gamma_{iw}$ and $\Delta G_v$ represent respectively the ice-water interfacial energy and the free energy associated with the water freezing point depression per unit volume. At the experimental temperature T=−15° C., $\gamma_{iw}$=24 mN/m and $\Delta G_v = \Delta H_v(T_f-T)/T_f = 18.35$ MJ/m$^3$, where $\Delta H$=334 MJ/m$^3$ is the volumetric fusion energy of ice melting (see Lide, D. R., *CRC Handbook of Chemistry and Physics*, Internet Version 2007, (87th Edition), Taylor and Francis, Boca Raton, Fla., 2007, which is incorporated by reference in its entirety), and the ice melting point is $T_f$=273 K. Using these values, the size of a critical ice nucleus is expected to be $r_c \approx 2.6$ nm. As shown in FIG. 12B, the feature size on the PDMS-PEG surface is on the micron scale and the mean square roughness is about 40 nm. Therefore, the local surface mean radius of curvature is expected to be much larger than $10 r_c$. For such types of surface, Poulikakos et al. have shown that the nucleation temperature and nucleation delay are relatively insensitive to the surface roughness. See, Eberle, P.; Tiwari, M. K.; Maitra, T.; Poulikakos, D., Rational Nanostructuring of Surfaces for Extraordinary Icephobicity. *Nanoscale* 2014, 6, 4874-4881, and Schutzius, T. M.; Jung, S.; Maitra, T.; Eberle, P.; Antonini, C.; Stamatopoulos, C.; Poulikakos, D., Physics of Icing and Rational Design of Surfaces with Extraordinary Icephobicity. *Langmuir* 2014, 31, 4807-4821, each of which is incorporated by reference in its entirety. Therefore, changes in surface roughness due to the incorporation of PDMS-PEG are unlikely to result in the observed delayed onset of icing. Second, the quasi-liquid layer also has reduced heat conductivity so the rate of heat transfer from the bulk water to the substrate is also lowered. See, Foster, K. R.; Cheever, E.; Leonard, J. B.; Blum, F. D., Transport Properties of Polymer Solutions. a Comparative Approach. *Biophys. J.* 1984, 45, 975, which is incorporated by reference in its entirety. However, considering the nanometer scale thickness of the quasi-liquid layer, the freezing-delay effect due to the lowered heat conductivity is presumably small. Third, as discussed in the NMR $T_2$ analysis, the increased water viscosity in the quasi-liquid layer can significantly reduce the ice nucleation rate. See, Jung, S.; Dorrestijn, M.; Raps, D.; Das, A.; Megaridis, C. M.; Poulikakos, D., Are Superhydrophobic Surfaces Best for Icephobicity? *Langmuir* 2011, 27, 3059-3066, Kim, H. I.; Kushmerick, J. G.; Houston, J. E.; Bunker, B. C., Viscous "Interphase" Water Adjacent to Oligo (Ethylene Glycol)-Terminated Monolayers. *Langmuir* 2003, 19, 9271-9275, and Li, K.; Xu, S.; Chen, J.; Zhang, Q.; Zhang, Y.; Cui, D.; Zhou, X.; Wang, J.; Song, Y., Viscosity of Interfacial Water Regulates Ice Nucleation. *Appl. Phys. Lett.* 2014, 104, 101605, each of which is incorporated by reference in its entirety. When viewed holistically, the major factor for freezing-delay is expected to be the increased viscosity of the water microenvironments measured in the quasi-liquid layer at the interface.

A scalable, self-lubricating icephobic coatings by blending commercially available amphiphilic copolymers into a polymer coating matrix. Such coatings provide low ice adhesion strength values that are comparable to, or in some cases, much lower than what has previously been achieved using smooth hydrophobic solid surfaces. The molecular mechanisms that are responsible for the low ice adhesion values observed on these two types of surfaces are compared and contrasted. For the hydrophobic surfaces, the increased thickness of the water depletion layer at the interface weakens the van der Waal's interaction between the ice and the underlying substrate. The existence of such a water depletion layer at the interface has been confirmed previously both experimentally and by molecular dynamics simulations. By contrast, in the amphiphilic coatings, the addition of a small mass fraction of PDMS-PEG copolymer helps promote the retention of a viscous lubricating liquid-like layer at the interface. The surface-segregated PEG component can strongly hydrogen bond with water molecules. The resulting hydrogen-bonded water does not freeze even at substantial levels of subcooling, and therefore serves as a self-lubricating interfacial layer that helps to reduce the adhesion strength of ice to the surface. The existence of non-frozen water at the ice-solid interface is confirmed by solid-state nuclear magnetic resonance (NMR) spectroscopy. NMR $T_2$ relaxation analysis allows us to quantify the high viscosity of the non-frozen water molecules hydrogen bonded to PEG, which is also expected to contribute to the delayed heterogeneous ice nucleation on the coatings—another attractive property for producing icephobic surfaces. This method thus provides a passive anti-icing mechanism without the need for impregnating a porous matrix with liquid phases that can leach into the environment, causing water or land pollution. The low mass fraction of copolymer required (1 wt %) means that such coatings can be easily and inexpensively retrofitted to existing structures such as airplane wings and wind turbine blades by simply blending the active amphiphilic copolymers into the current protective coatings, conferring up to three fold reduction in ice adhesion for a 1 wt % addition.

This method provides the substrate with a thin polymeric film coating that contains a small amount of amphiphilic copolymers. Such surface coating helps to reduce or retard ice formation, and to reduce the ice adhesion strength on a substrate. The amphiphilic copolymers in use are PDMS-PEG copolymers. PDMS-PEG molecules are selected because their low glass transition and they are environmentally responsive to moisture. Polymer coatings that contain PDMS-PEG molecules show low ice adhesion. PDMS-PEG molecules with certain compositions are water-insoluble so rain washing won't cause the anti-icing property to deteriorate. These advantages lead to robust anti-icing polymer coatings.

Water-insoluble PDMS-PEG molecules are blended in a polymer film coating. So the polymer film serves as a matrix reservoir for replenishing the removed PDMS-PEG molecules from the surface. Such removal can happen due to abrasion either in repeating deicing events or in other operations.

PEG repeating units form strong hydrogen bonds with water molecules. Such hydrogen-bonded water won't freeze within certain degree of supercooling, leads to the formation of a quasi-liquid layer (QLL) at the interface of the bulk ice and polymer coating. The QLL serves as a self-lubricating layer in reducing the ice adhesion strength to the polymer coating. This approach can apply to other amphiphilic copolymers that can lead to the formation of a self-lubricating QLL, apart from PDMS-PEG copolymers.

This method provides a passive anti-icing system, which is not harmful to the environment, not causing water and land pollution. It can be easily and inexpensively installed on fielded structures by simply blending the active amphiphilic copolymers into the current protection coatings. The small amount of incorporated active amphiphilic copolymers does not appreciably change the mechanical and optical properties of the current protection coatings.

Hydrophilic surfaces attract water; hydrophobic surfaces, by comparison, have energetically unfavorable interactions with water. These relatively unfavorable interactions result in familiar characteristics of hydrophobic surfaces, such as the beading and rolling of rainwater that lands on the hood of a recently waxed car. In general, a non-hydrophobic surface can be made hydrophobic by coating the surface with a hydrophobic material. The hydrophobicity of a surface can be measured, for example, by determining the contact angle of a drop of water on the surface. The contact angle can be a static contact angle or dynamic contact angle. A dynamic contact angle measurement can include determining an advancing contact angle or a receding contact angle, or both.

A lock-in or crosslinking step can enhance the durability of the coating. The lock-in can be achieved by, for example, exposure of the coating to chemical or thermal reaction conditions. The coating polymers can become crosslinked and thereby less susceptible to mechanical damage. In some cases, chemical crosslinking step can include treatment of a polymeric coating with a certain chemical agent. A chemical crosslinking step can be preferred when the coating is formed on a substrate that is unstable at temperatures required for crosslinking (such as, for example, when the substrate is a plastic that would deform at the temperatures required for crosslinking). The crosslinking step can be a photocrosslinking step. The photocrosslinking can use a sensitizer (e.g., a light-sensitive group) and exposure to light (such as UV, visible or IR light) to achieve crosslinking. Masks can be used to form a pattern of crosslinked and non-crosslinked regions on a surface. Other methods for crosslinking polymer chains are known.

Other embodiments are within the scope of the following claims.

What is claimed is:

1. An anti-icing article comprising a coating including polymer film composition including a matrix polymer blended with an amphiphilic copolymer on a surface of the article such that the polymer film serves as a matrix reservoir for replenishing amphiphilic copolymer molecules from a surface.

2. The article of claim 1, wherein the matrix polymer includes a polydimethylsiloxane elastomer, an epoxy, a polyurethane or a fluorinated polyurethane.

3. The article of claim 1, wherein the amphiphilic copolymer includes a polyethylene glycol copolymer.

4. The article of claim 3, wherein the polymer composition includes less than 10% of the polyethylene glycol copolymer.

5. The article of claim 3, wherein the polymer composition includes less than 5% of the polyethylene glycol copolymer.

6. The article of claim 3, wherein the polymer composition includes less than 3% of the polyethylene glycol copolymer.

7. The article of claim 3, wherein the polymer composition includes about 1% of the polyethylene glycol copolymer.

8. The article of claim 3, wherein the polyethylene glycol copolymer includes a polysiloxane-polyethylene glycol copolymer.

9. The article of claim 8, wherein the matrix polymer includes polydimethylsiloxane.

10. A method of forming an anti-icing coating a surface of an article, comprising
depositing a polymer film composition including a matrix polymer blended with an amphiphilic copolymer on a surface such that the polymer film serves as a matrix reservoir for replenishing amphiphilic copolymer molecules from a surface.

11. The method of claim 10, wherein the matrix polymer includes a polydimethylsiloxane elastomer, an epoxy, a polyurethane or a fluorinated polyurethane.

12. The method of claim 10, wherein the amphiphilic copolymer includes a polyethylene glycol copolymer.

13. The method of claim 12, wherein the polymer composition includes less than 10% of the polyethylene glycol copolymer.

14. The method of claim 12, wherein the polymer composition includes less than 5% of the polyethylene glycol copolymer.

15. The method of claim 12, wherein the polymer composition includes less than 3% of the polyethylene glycol copolymer.

16. The method of claim 12, wherein the polymer composition includes about 1% of the polyethylene glycol copolymer.

17. The method of claim 12, wherein the polyethylene glycol copolymer includes a polysiloxane-polyethylene glycol copolymer.

18. The method of claim 17, wherein the matrix polymer includes polydimethylsiloxane.

* * * * *